(12) United States Patent
Bladel et al.

(10) Patent No.: US 8,355,527 B2
(45) Date of Patent: Jan. 15, 2013

(54) SYSTEMS AND METHODS FOR PERSON'S VERIFICATION USING PHOTOGRAPHS ON IDENTIFICATION DOCUMENTS TAKEN BY A VERIFIER-CONTROLLED MOBILE DEVICE

(75) Inventors: James M. Bladel, Le Clair, IA (US); Yong Lee, Chandler, AZ (US); Noah D. Plumb, Phoenix, AZ (US); Wayne Thayer, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 138 days.

(21) Appl. No.: 13/018,599

(22) Filed: Feb. 1, 2011

(65) Prior Publication Data

US 2012/0114190 A1 May 10, 2012

Related U.S. Application Data

(63) Continuation of application No. 12/939,917, filed on Nov. 4, 2010, and a continuation of application No. 12/939,925, filed on Nov. 4, 2010.

(51) Int. Cl.
*G06K 9/00* (2006.01)
*H04M 3/493* (2006.01)

(52) U.S. Cl. ............... 382/100; 382/220; 455/414.2
(58) Field of Classification Search .......... 382/100, 382/103, 106, 112–118, 132–139, 155, 162, 382/168, 181, 190, 209, 219, 232, 254, 274, 382/276, 291, 305, 312, 313, 321.22; 713/186; 455/556.1, 414.2
See application file for complete search history.

(56) References Cited

U.S. PATENT DOCUMENTS

| | | | | |
|---|---|---|---|---|
| 7,433,710 | B2 * | 10/2008 | Bodnar et al. | 455/556.1 |
| 7,599,847 | B2 * | 10/2009 | Block et al. | 705/5 |
| 7,804,982 | B2 * | 9/2010 | Howard et al. | 382/115 |
| 8,024,578 | B2 * | 9/2011 | Geosimonian | 713/186 |
| 2008/0182561 | A1 * | 7/2008 | Kim et al. | 455/414.2 |
| 2012/0114191 | A1 * | 5/2012 | Bladel et al. | 382/115 |

* cited by examiner

*Primary Examiner* — Seyed Azarian
(74) *Attorney, Agent, or Firm* — Stewart J. Womack

(57) ABSTRACT

One embodiment of the present invention envisions providing requester with an application for a mobile device equipped with a built-in digital photo camera. The application controls the camera and prevents alterations to an image taken with the camera. The unaltered image of a photo ID is transmitted from the mobile device to the verifier's server computer. The image of the photo ID may further be used to verify the requester by comparing the image to the photographs from other sources.

34 Claims, 24 Drawing Sheets means for providing a requester with a computer-readable program for a digital mobile device equipped with a built-in digital photo camera, wherein said computer-readable program controls said digital photo camera and prevents alterations to an image taken with said digital photo camera on said digital mobile device — 1905 means for transmitting from said digital mobile device to a server computer a portrait photograph of said requester, taken with said digital photo camera on said digital mobile device, wherein transmitting is achieved by a first computer-readable code on said server computer and by a second computer-readable code on said digital mobile device, and wherein said server computer and said digital mobile device are communicatively connected via a computer network — 1910

SYSTEMS AND METHODS FOR PERSON'S VERIFICATION USING PHOTOGRAPHS ON IDENTIFICATION DOCUMENTS TAKEN BY A VERIFIER-CONTROLLED MOBILE DEVICE

CROSS REFERENCE TO RELATED PATENT APPLICATIONS

This patent application is continuation-in-part to the following patent applications:

U.S. patent application Ser. No. 12/939,917, "Methods for Person's Verification Using Photographs on Identification Documents," filed Nov. 4, 2010.

U.S. patent application Ser. No. 12/939,925, "Systems for Person's Verification Using Photographs on Identification Documents," filed Nov. 4, 2010.

This patent application is further related to the following concurrently-filed patent applications:

U.S. patent application Ser. No. 13/018602, "Systems and Methods for Person's Verification Using Photographs on Identification Documents Taken by a Verifier-Controlled Digital Camera."

U.S. patent application Ser. No. 13/018607, "Systems and Methods for Person's Verification Using Scans of Identification Documents Produced by a Verifier-Controlled Scanning Device."

U.S. patent application Ser. No. 13/018612, "Systems and Methods for Person's Verification Using Portrait Photographs Taken by a Verifier-Controlled Mobile Device."

U.S. patent application Ser. No. 13/018616, "Systems and Methods for Person's Verification Using Portrait Photographs Taken by a Verifier-Controlled Digital Camera."

The subject matter of all patent applications is commonly owned and assigned to The Go Daddy Group, Inc. All prior and concurrent applications are incorporated herein in their entirety by reference.

FIELD OF THE INVENTION

The present invention relates in general to person's verification online using unaltered photographs obtained via verifier-controlled devices.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be more and more valuable. People are increasingly using the Web for everyday tasks such as social networking, shopping, banking, paying bills, and consuming media and entertainment. E-commerce is growing, with businesses delivering more services and content across the Internet, communicating and collaborating online, and inventing new ways to connect with each other.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER, MOZILLA FIREFOX, or GOOGLE CHROME. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

An individual or entity's domain name is increasingly the anchor around which their online presence is maintained. For example, a company's website (www.companyname.com) and email system (john.doe@companyname.com) utilize the company's domain name as an integral part of their architecture. Similarly, many Internet users use their email address, and therefore their domain name, as a means of identification on social websites, which have proliferated in recent years. Social websites are social networking services that focus on building and verifying online social networks for communities of people who share interests and activities, or who are interested in exploring the interests and activities of others, and which necessitates the use of software. Most social websites are Internet based and provide a collection of various ways for users to interact, such as chat, messaging, email, video, voice chat, personal information sharing, image sharing, video sharing, file sharing, status updates, blogging, discussion groups, commentary, etc. The main types of social networking services are those which contain directories of some categories (such as former classmates), means to connect with friends (usually with self-description pages), and/or recommendation systems linked to trust. Popular methods now combine many of these, with MYSPACE, BEBO, FACEBOOK, TWITTER, YOUTUBE, LINKEDIN, PHOTOBUCKET, SNAPFISH, WINDOWS LIVE PHOTOS, WEBSHOTS, and FLICKR being but a few examples.

Such social websites often post their members' public webpages for all Internet users to view, without authentication or login. Conversely, members' private webpages may only be accessed and viewed by the member. The private webpages generally require member authentication and provide the member with tools to manage his public webpage, communicate with other members, and/or otherwise manage his social website membership.

Many social websites, typically those that receive or share sensitive information (as well as websites associated with banks, credit card companies, and online businesses), may require Internet users to login to the website with a secure username and password before accessing the website's content.

The username/password system is a common form of secret authentication data used to control website access. The username/password is kept secret from those not allowed access. Those wishing to gain access are tested on whether or not they have a valid (recognized) username and whether they know the associated password. Internet users are granted or denied access to websites accordingly.

Many social websites have different rules governing the creation of usernames and passwords. Some require passwords that include a complex combination of letters, numbers, and other characters. Others have no restrictions whatsoever. With the proliferation of login-access websites, Internet users often must remember dozens (or more) different username/password combinations, one for each secure website they wish to access. This has resulted in what has come to be known as "password fatigue."

Partly in response to these issues, the concept of the "digital identity" has evolved. A digital identity is a set of characteristics by which a person or thing is recognizable or distinguished in the digital realm. Digital identity allows for the electronic recognition of an individual or thing without confusing it for someone or something else.

There are many applications for an Internet user's digital identity, including authenticating the user before permitting access to a website. One method for such authentication includes the use of a URL. URL-based digital identity systems (such as OPENID) utilize a framework based on the concept that any individual or entity can identify themselves on the Internet with a URL provided by a Digital Identity Provider (e.g., johndoe.openid.com). The Digital Identity Provider maintains an Identity Server on which a Digital Identity Database (a database of provided digital identity URLs and the corresponding authentication passwords) is stored.

Once obtained, the Internet user may utilize their digital identity URL to access various websites. For example, to login to an OpenID-enabled website, the user enters their OpenID (e.g., johndoe.openid.com) in the username box. The user is then momentarily redirected to the user's Digital Identity Provider's website (or an authentication window appears) to login using whatever password they have set up with their Digital Identity Provider. Once authenticated, the Digital Identity Provider sends the participating website an encrypted message (a token) confirming the identity of the person logging in. There are currently numerous Digital Identity Providers offering URL-based (OpenID) digital identity services, meaning they offer digital identity URLs and servers to authenticate them.

One of the problems facing companies doing business online is verifying that digital identity actually belongs to a real human being (person) and that this particular real human being is not impersonating somebody else. Most validation systems today do it by sending an email message to person's email address. The email message typically contains a unique link or code that person should provide back to the verifier (often via a verifier's website). These systems are not able to validate the real identity of a person because the systems only check whether the requester has control over the email account.

Applicant has noticed that presently-existing systems and methods do not allow for efficient and robust matching of digital identities with the actual human persons. For the foregoing reason, there is a need for the systems and methods that would allow for establishing and verifying identity of a human person.

Therefore, new systems and methods are needed to overcome the limitations of the current systems and methods.

BRIEF DESCRIPTION OF THE DRAWINGS

FIGS. 4, 7, 8, 11, 12, 15, 16, 19, 20, 23, and 24 are block diagrams illustrating embodiments of means-plus-function systems of the present invention.

DETAILED DESCRIPTION AND PREFERRED EMBODIMENT

Figure 1:
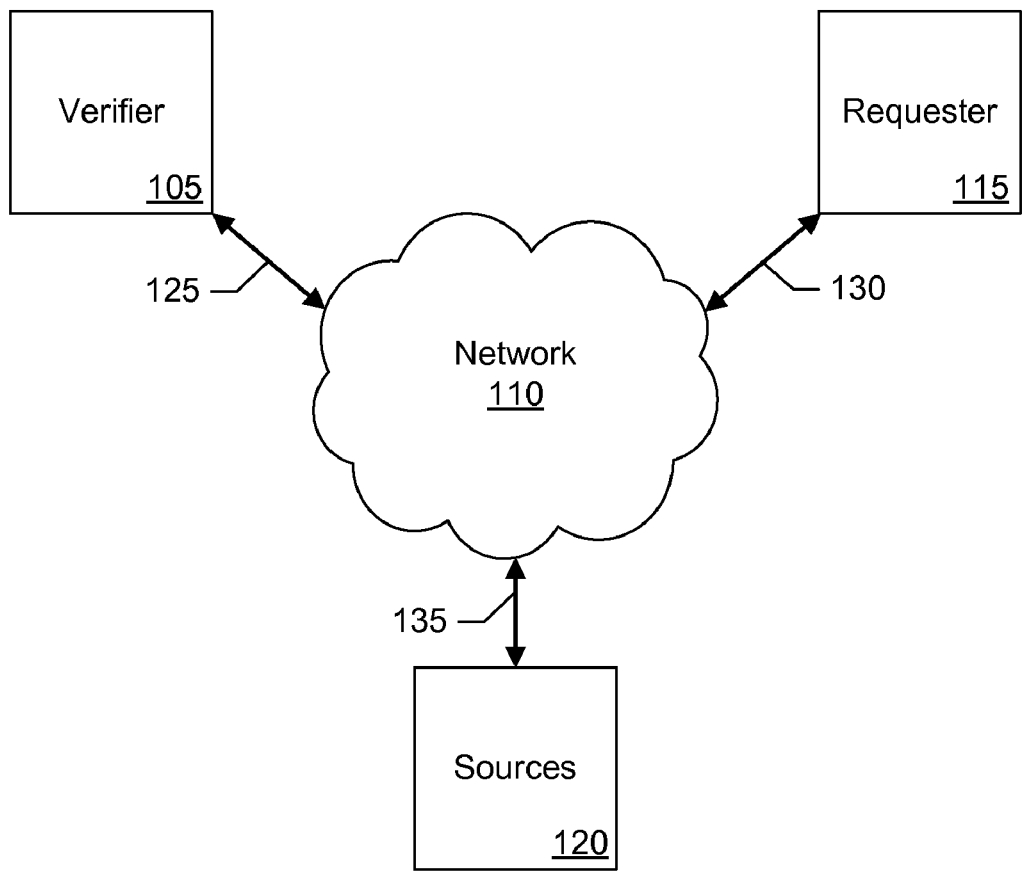
FIG. 1 is a block diagram illustrating high-level components of an embodiment of a system of the present invention.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

For the purpose of this disclosure the term "Verifier" refers a commercial company, a non-profit organization, a governmental agency, a business operator, a business owner, a person, an entity, a management of an entity. The term "Verifier" also includes a person or entity acting on behalf of the above mentioned parties. Further, the term "Verifier" includes a computer system ran by above mentioned parties.

One of the objectives of the present invention is to find a new way to validate a person if he/she is able to supply an identification document that contains a photograph of a face of that person (e.g., Photo ID). The approach used in the invention for validating identify of the person includes comparing the provided photograph on the photo ID against the images that are available through various websites, including image sharing and social networks websites. Among such websites may be mentioned MYSPACE, BEBO, FACEBOOK, TWITTER, YOUTUBE, LINKEDIN, PHOTOBUCKET, SNAPFISH, WINDOWS LIVE PHOTOS, WEBSHOTS, FLICKR, etc. Many users upload pictures of themselves or other users to these websites. The user's personal information may be used to find relevant images displaying the person who needs to be verified.

Referring to FIG. 1, an exemplary embodiment of the system of the present invention may include a Verifier 105 connectively coupled to a Network 110 via a first Communication Link 125, a Requester 115 connectively coupled to the Network 110 via a second Communication Link 130, and one or more Sources 120 (i.e., computer network information sources) connectively coupled to the Network 110 via a third Communication Link 135. The Verifier 105 is typically a business interested in verifying identity of the Requester 115 using the Sources 120. The Requester 115 is one or more network users, who generally need to be verified with the Verifier 105. The Sources 120 include for example a website, a webpage, an online blog, a social network website, a picture/image sharing webpage, etc.

The Network 110 is a computer network. It may include a LAN (Local Area Network), WLAN (Wireless Local Area Network), WAN (Wide Area Network), MAN (Metropolitan Area Network), a global network, etc. The Internet is a widely-used global computer network. The Network 110 may support a variety of a network layer protocols, such as, DHCP (Dynamic Host Configuration Protocol), DVMRP (Distance Vector Multicast Routing Protocol), ICMP/ICMPv6 (Internet Control Message Protocol), IGMP (Internet Group Management Protocol), IP (Internet Protocol version 4), IPv6 (Internet Protocol version 6), MARS (Multicast Address Resolution Server), PIM and PIM-SM (Protocol Independent Multicast-Sparse Mode), RIP2 (Routing Information Protocol), RIPng for IPv6 (Routing Information Protocol for IPv6), RSVP (Resource ReSerVation setup Protocol), VRRP (Virtual Router Redundancy Protocol), etc. Further, the Network 110 may support a variety of a transport layer protocols, such as, ISTP (Internet Signaling Transport Protocol), Mobile IP (Mobile IP Protocol), RUDP (Reliable UDP), TALI (Transport Adapter Layer Interface), TCP (Transmission Control Protocol), UDP (User Datagram Protocol), Van Jacobson (compressed TCP), XOT (X.25 over TCP), etc. In addition, the Network 110 may support a variety of an application layer protocols, such as, COPS (Common Open Policy Service), FANP (Flow Attribute Notification Protocol), Finger (User Information Protocol), FTP (File Transfer Protocol), HTTP (Hypertext Transfer Protocol), IMAP and IMAP4 (Internet Message Access Protocol, rev 4), IMPPpre (Instant Messaging Presence Protocol), IMPPmes (Instant Messaging Protocol), IPDC (IP Device Control), IRC (Internet Relay Chat Protocol), ISAKMP (Internet Message Access Protocol version 4rev1), ISP, NTP (Network Time Protocol), POP and POP3 (Post Office Protocol, version 3), Radius (Remote Authentication Dial In User Service), RLOGIN (Remote Login), RTSP (Real-time Streaming Protocol), SCTP (Stream Control Transmission Protocol), S-HTTP or HTTPS (Secure Hypertext Transfer Protocol), SLP (Service Location Protocol), SMTP (Simple Mail Transfer Protocol), SNMP (Simple Network Management Protocol), SOCKS (Socket Secure Server), TACACS+ (Terminal Access Controller Access Control System), TELNET (TCP/IP Terminal Emulation Protocol), TFTP (Trivial File Transfer Protocol), WCCP (Web Cache Coordination Protocol), X-Window (X Window), etc. The Network 110 supports digital interactions between the Verifier 105, the Requester 115, and the Sources 120.

Figure 2:
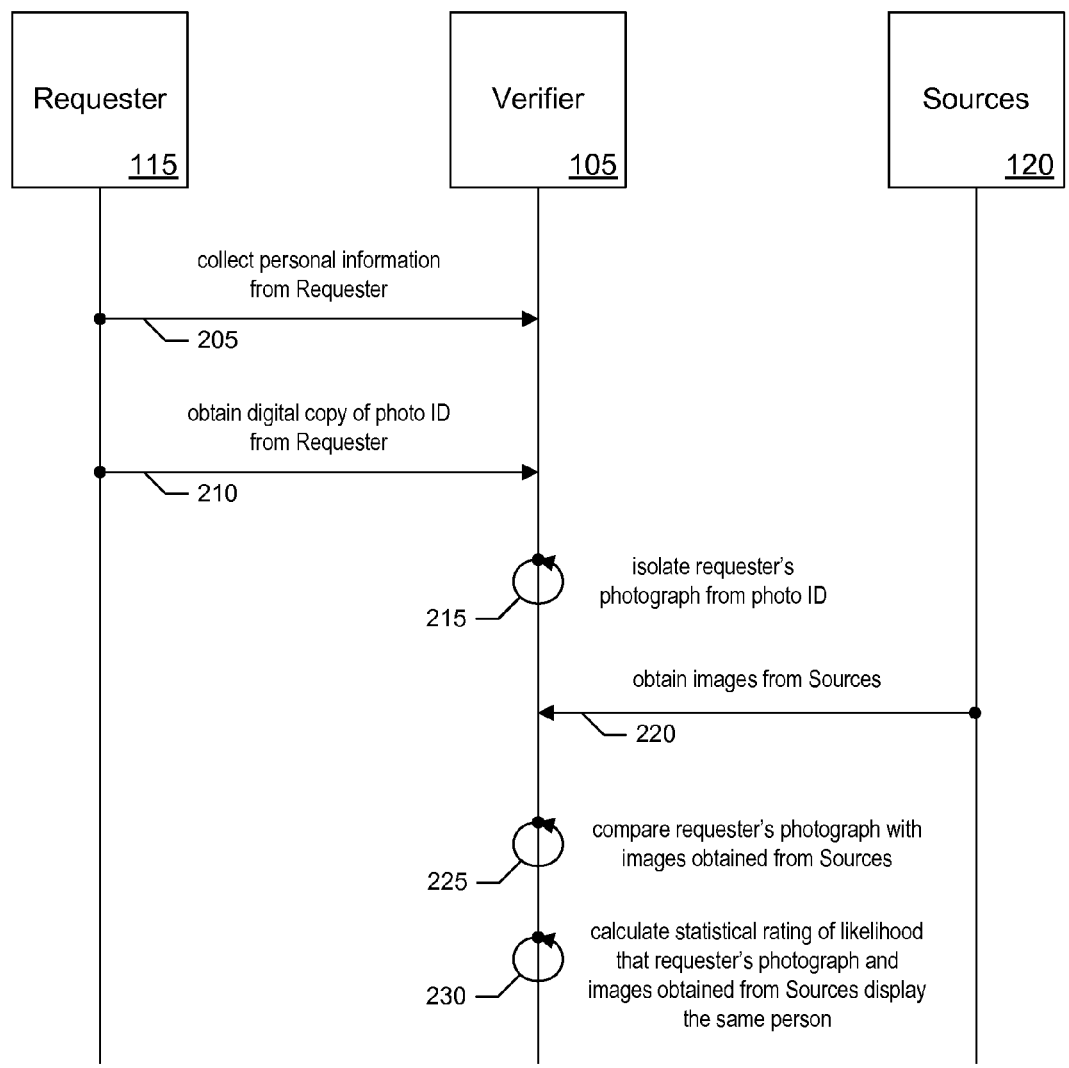
FIG. 2 is an interaction diagram illustrating interactions between the high-level components of a system of the present invention.

An exemplary embodiment of interactions between the system components is shown in FIG. 2. The Verifier 105 collects personal information from the Requester 115 (step 205). In a preferred embodiment the Verifier 105 collects personal information from the Requester 115 via a web-based graphical user interface. The Verifier 105 obtains a digital copy of a photo ID from the Requester 115 (step 210). The Verifier 105 isolates requester's photograph from the photo ID (step 215). The Verifier 105 then obtains images from the Sources 120 (step 220) and compares requester's photograph with images obtained from the Sources 120 (step 225). The Verifier 105 then calculates a statistical rating of likelihood that requester's photograph and images obtained from the Sources 120 depict the same person based on the results of comparison of requester's photograph and images obtained from the Sources 120 (step 230). The value of statistical rating indicates whether the Requester 115 was authenticated or not.

If the collection of personal information and obtaining a digital copy of a photo ID from the Requester 115 is enabled via a web-based graphical user interface, the web-based graphical user interface is typically a website or a webpage. The web-based graphical user interface is achieved by a first computer-readable code on a server computer of the Verifier 105 and by a second computer-readable code on a desktop/remote computer of the Requester 115. The first computer-readable code may comprise, for example, SGML, HTML, DHTML, XML, XHTML, CSS, server-side programming languages and scripts, such as, Perl, PHP, ASP, ASP.NET, Java, JavaScript, Visual J++, J#, C, C++, C#, Visual Basic, VB.Net, VBScript, server-side databases, etc. The second computer-readable code may comprise, for example, SGML (Standard Generalized Markup Language), HTML (Hyper-Text Markup Language), DHTML (Dynamic HTML), XML (eXtensible Markup Language), XHTML (eXtensible HTML), CSS (Cascading Style Sheet), client-side programming scripts, such as, JavaScript and VBScript, client-side databases, etc. Both the first computer-readable code and the second computer-readable code can support embedded objects, such as, audio and video elements, ActiveX controls, etc. Alternatively, collection of personal information from the Requester 115 may be enabled via other means, e.g., a desktop software or an application on a mobile device.

The server computer of the Verifier 105 can be running a variety of operating systems, such as, MICROSOFT WINDOWS, APPLE MAC OS X, UNIX, LINUX, GNU, BSD, FreeBSD, SUN SOLARIS, NOVELL NETWARE, OS/2, TPF, eCS (eComStation), VMS, Digital VMS, OpenVMS, AIX, z/OS, HP-UX, OS-400, etc. The web-based graphical user interface may be provided by a web-server software running on the server computer of the Verifier 105. The web-server software may include MICROSOFT IIS (Internet Information Services/Server), APACHE HTTP SERVER, APACHE TOMCAT, nginx, GWS (GOOGLE WEB SERVER), SUN JAVA SYSTEM WEB SERVER, etc.

The Verifier 105 computer systems can contain one or more physical servers. The physical servers can play different roles in the system of the invention, e.g., a Web Server, a Mail Server, an Application Server, a Database Server, a DNS (Domain Name System) Server, etc. The Verifier 105 computer systems can be based on a variety of hardware platforms, such as, x86, x64, INTEL, ITANIUM, IA64, AMD, SUN SPARC, IBM, HP, etc.

The Requester 115 computer systems are electronic devices suitable for interaction over the Network 110. The Requester 115 computer systems may contain, for example, a personal computer, a desktop computer, a laptop computer, a notebook computer, a tablet computer, a cell phone, a smart phone, a PDA, a palmtop computer, a handheld computer, a pocket computer, a touch screen device, an IBM PC-compatible electronic device, an APPLE MAC-compatible electronic device, a computing device, a digital device, or another electronic device or combination thereof.

The Verifier 105, the Requester 115, and the Sources 120 are communicatively connected to the Network 110 via the Communication Links 125, 130, and 135. The Communication Links 125, 130, and 135 are wired or wireless connections suitable for exchange of digital information. The Communication Links 125, 130, and 135 may include telephone line, copper twisted pair, power-line, fiber-optic, cellular, satellite, dial-up, Ethernet, DSL, ISDN, T-1, DS-1, Wi-Fi, etc.

The Verifier 105 computer systems may be located in a physical datacenter, in a virtual datacenter, in a variety of countries or territories, on a floating device, be connected to the Internet backbone, be connected to a power grid, etc. The floating device may be a marine or naval vessel or ship. Verifier 105 computer systems may be cooled by air or liquid, such as water, including ocean or sea water.

Figure 3:
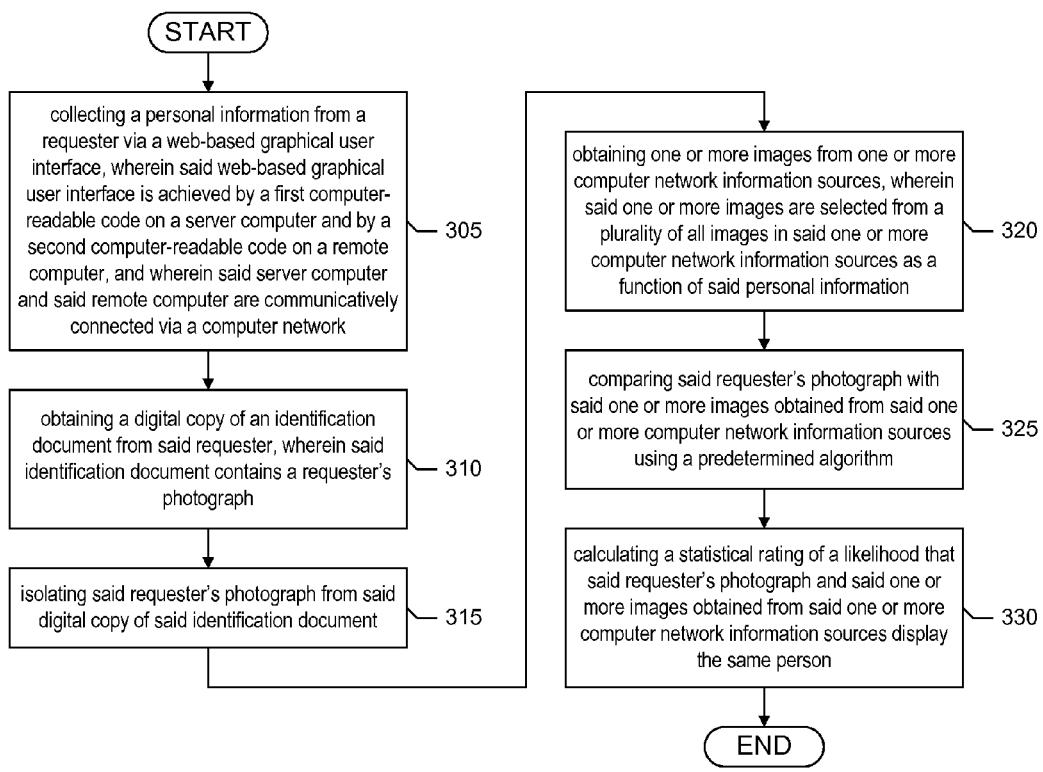
FIGS. 3, 5, 6, 9, 10, 13, 14, 17, 18, 21, and 22 are flowcharts illustrating embodiments of methods of the present invention.

An exemplary embodiment of a method of present invention is shown in FIG. 3. The method comprises the steps of: collecting a personal information from a requester via a web-based graphical user interface, where the web-based graphical user interface is achieved by a first computer-readable code on a server computer and by a second computer-readable code on a remote computer, and where the server computer and the remote computer are communicatively connected via a computer network (step 305), obtaining a digital copy of an identification document from the requester, where the identification document contains a requester's photograph (step 310), isolating the requester's photograph from the digital copy of the identification document (step 315), obtaining one or more images from one or more computer network information sources, where one or more images are selected from a plurality of all images in one or more computer network information sources as a function of the personal information (step 320), comparing the requester's photograph with one or more images obtained from one or more computer network information sources using a predetermined algorithm (step 325), and calculating a statistical rating of a likelihood that the requester's photograph and one or more images obtained from one or more computer network information sources depict the same person (step 330).

The personal information may include name, mailing address, home address, electronic mail address, telephone number, date of birth of the requester, login name to a website (e.g., social network or image sharing website), an account number or an account name of the requester to a website (e.g., social network or image sharing website), a password of the requester to a website (e.g., social network or image sharing website), and a variety of other information that may be associated with the requester.

The computer network may be the Internet.

Obtaining the digital copy of an identification document from the requester may be performed in a variety of ways. For example, the requester can scan the identification document on a scanner, take a digital picture of the identification document with a digital camera, take a digital picture of the identification document with a mobile device equipped with a built-in camera (e.g. smart phone, such as IPHONE, BLACKBERRY, DROID/ANDROID, HTC, PALM), etc. The requester may email the digital copy (scan/digital picture) of the identification document to the verifier, upload it on a website, or use an application on a mobile device to transmit the digital copy to the verifier.

The identification document may include a government issued identification document, driver's license, passport, state or province identification card, corporate identification card, and variety of other documents issued to the requester and containing requester's photograph.

The isolating the requester's photograph from the digital copy of the identification document may include analyzing the digital copy of the identification document using an optical face detection algorithm and identifying an area of the digital copy of the identification document containing facial features. Some types of identification documents are pretty common, thus their formats and the location of the photograph on them are known as well. Therefore, an algorithm can be applied to the digital copy of the identification document to determine the type of the document. The photograph's location (predetermined area) corresponding with that particular type of the document may be recalled from a database, and requester's photograph may be extracted from the predetermined area of the digital copy of the identification document.

The computer network information sources may include a website, a webpage, an online blog, a social network website, an image sharing website, and a variety of other digital sources.

The methods of the present invention may utilize a variety of mechanisms to select the images from the computer network information sources. For example, images posted onto the computer network information sources from an account of the requester, or images tagged with a name of the requester, or images appearing in a social network account of the requester may be selected. A variety of other mechanisms may be utilized that select the images with some probability that a facial depiction of the requester is appearing on the image.

The methods of the present invention further may extract a first set of facial features from the requester's photograph and a second set of facial features from the images obtained from the computer network information sources.

The first set of facial features from the requester's photograph and the second set of facial features from the images obtained from the computer network information sources may be compared utilizing a predetermined algorithm. The predetermined algorithm may include the principal component analysis with eigenface, the linear discriminate analysis, elastic bunch graph matching fisherface, the Hidden Markov model, the neuronal motivated dynamic link matching, skin texture analysis, face hallucination (low-resolution images enhancement), and many others.

The statistical rating of a likelihood that the requester's photograph and the image obtained from the computer network information sources depict the same person may be calculated in various ranges. It may be a range of real numbers from 0 to 1, where value 0 indicates the lowest likelihood and value 1 indicates the highest likelihood that the requester's photograph and the image obtained from the computer network information sources depict the same person. In one embodiment, the statistical rating of value 0.5 and above indicates that the requester's photograph and the image obtained from the computer network information sources depict the same person. In an embodiment, the statistical rating is calculated as an integer number of 0 or 1.

Figure 4:
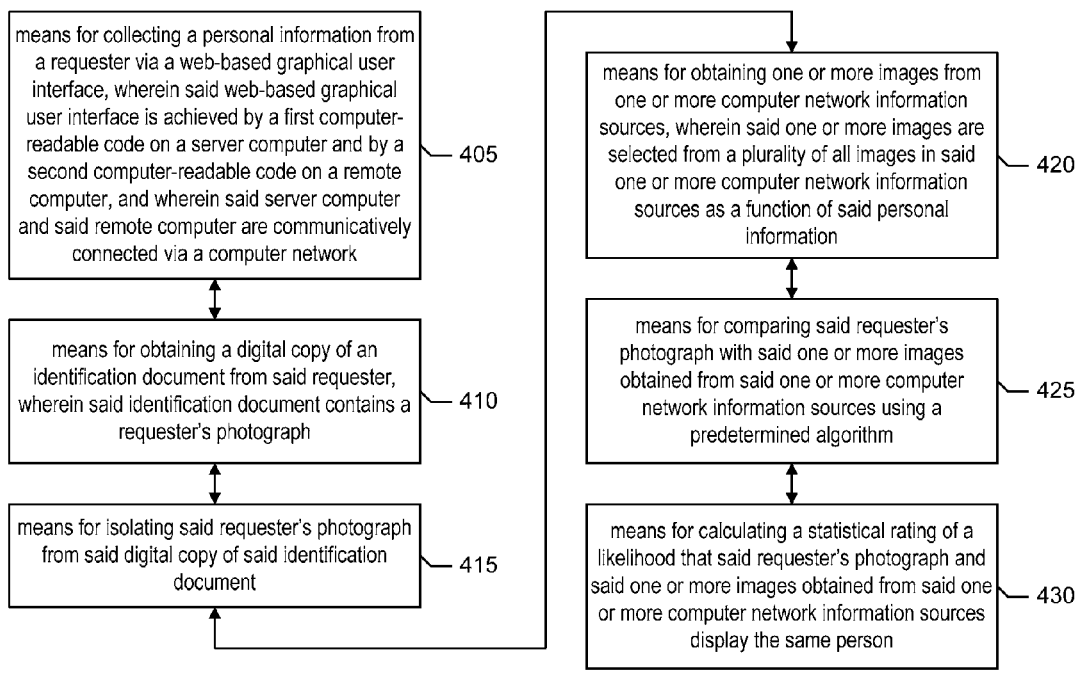

Referring to FIG. 4, an exemplary embodiment of the system of the present invention may include: means for collecting a personal information from a requester via a web-based graphical user interface, where the web-based graphical user interface is achieved by a first computer-readable code on a server computer and by a second computer-readable code on a remote computer, and where the server computer and the remote computer are communicatively connected via a computer network (405), means for obtaining a digital copy of an identification document from the requester, where the identification document contains a requester's photograph (410), means for isolating the requester's photograph from the digital copy of the identification document (415), means for obtaining one or more images from one or more computer network information sources, where one or more images are selected from a plurality of all images in one or more computer network information sources as a function of the personal information (420), means for comparing the requester's photograph with one or more images obtained from one or more computer network information sources using a predetermined algorithm (425), and means for calculating a statistical rating of a likelihood that the requester's photograph and one or more images obtained from one or more computer network information sources depict the same person (430).

The personal information may include name, mailing address, home address, electronic mail address, telephone number, date of birth of the requester, login name to a website (e.g., social network or image sharing website), an account number or an account name of the requester to a website (e.g., social network or image sharing website), a password of the requester to a website (e.g., social network or image sharing website), and a variety of other information that may be associated with the requester.

The computer network may be the Internet.

The means for obtaining a digital copy of an identification document from the requester may include an email server, a website, an application on a mobile device, etc. The requester can scan the identification document on a scanner, take a digital picture of the identification document with a digital camera, take a digital picture of the identification document with a mobile device equipped with a built-in camera (e.g. smart phone, such as IPHONE, BLACKBERRY, DROID/ ANDROID, HTC, PALM), etc. The requester may email the digital copy (scan/digital picture) of the identification document to the verifier, upload it on the website, or use the application on a mobile device to transmit the digital copy to the verifier.

The identification document may include a government issued identification document, driver's license, passport, state or province identification card, corporate identification card, and variety of other documents issued to the requester and containing requester's photograph.

The means for isolating the requester's photograph from the digital copy of the identification document may include means for analyzing the digital copy of the identification document using an optical face detection algorithm and means for identifying an area of the digital copy of the identification document containing facial features. Some types of identification documents are pretty common, thus their formats and the location of the photograph on them are known as well. Therefore, an algorithm can be applied to the digital copy of the identification document to determine the type of the document. The photograph's location (predetermined area) corresponding with that particular type of the document may be recalled from a database, and requester's photograph may be extracted from the predetermined area of the digital copy of the identification document.

The computer network information sources may include a website, a webpage, an online blog, a social network website, an image sharing website, and a variety of other digital sources.

The systems of the present invention may utilize a variety of mechanisms to select the images from the computer network information sources. For example, images posted onto the computer network information sources from an account of the requester, or images tagged with a name of the requester, or images appearing in a social network account of the requester may be selected. A variety of other mechanisms may be utilized that select the images with some probability that a facial depiction of the requester is appearing on the image.

The systems of the present invention further may extract a first set of facial features from the requester's photograph and a second set of facial features from the images obtained from the computer network information sources.

The first set of facial features from the requester's photograph and the second set of facial features from the images obtained from the computer network information sources may be compared utilizing a predetermined algorithm. The predetermined algorithm may include the principal component analysis with eigenface, the linear discriminate analysis, elastic bunch graph matching fisherface, the Hidden Markov model, the neuronal motivated dynamic link matching, skin texture analysis, face hallucination (low-resolution images enhancement), and many others.

The statistical rating of a likelihood that the requester's photograph and the image obtained from the computer network information sources depict the same person may be calculated in various ranges. It may be a range of real numbers from 0 to 1, where value 0 indicates the lowest likelihood and value 1 indicates the highest likelihood that the requester's photograph and the image obtained from the computer network information sources depict the same person. In one embodiment, the statistical rating of value 0.5 and above indicates that the requester's photograph and the image obtained from the computer network information sources depict the same person. In an embodiment, the statistical rating is calculated as an integer number of 0 or 1.

Figure 5:
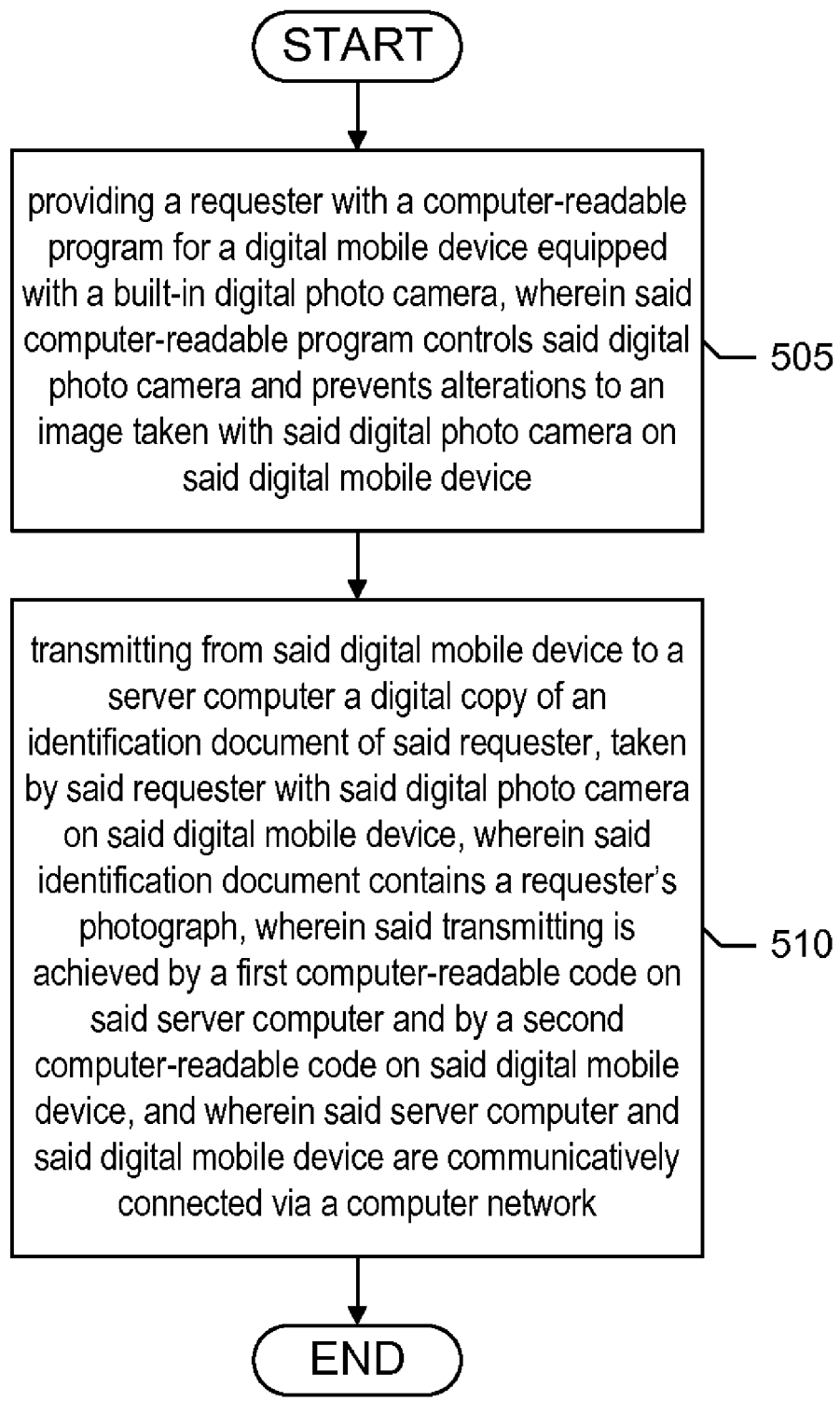

Another exemplary embodiment of a method of present invention is shown in FIG. 5. The method comprises the steps of: providing a requester with a computer-readable program (application) for a digital mobile device equipped with a built-in digital photo camera, where the computer-readable program controls the digital photo camera and prevents alterations to an image taken with the digital photo camera on the digital mobile device (step 505), and transmitting from the digital mobile device to a server computer a digital copy of an identification document of the requester, taken by the requester with the digital photo camera on the digital mobile device, where the identification document contains a requester's photograph, where the transmitting is achieved by a first computer-readable code on the server computer and by a second computer-readable code on the digital mobile device, and where the server computer and the digital mobile device are communicatively connected via a computer network (step 510).

The digital mobile device may include a cellular phone and other devices. Providing the requester with a computer-readable program for the digital mobile device may be accomplished via a website or an application running on the digital mobile device suitable for downloading and installing computer-readable programs. The software for digital mobile devices is commonly distributed by APPLE'S APP STORE, APPLE ITUNES, GOOGLE's ANDROID MARKET, PALM/HP's APP CATALOG, PALM's SOFTWARE STORE, RIM's APP WORLD, NOKIA's OVI STORE, MICROSOFT's WINDOWS PHONE MARKETPLACE, etc. The computer-readable program may be downloaded on the digital mobile device via a computer or cellular network, as well as via detachable memory storage devices.

The computer-readable program provided to the requester is designed to control the built-in digital photo camera of the digital mobile device and prevents alterations to an image taken with the digital photo camera. Thus, the verifier ensures that the photographs of the documents or the portrait photographs of the requester taken with the digital photo camera through the provided computer-readable program were not tempered with.

After the requester took a picture of the identification document with the digital photo camera of the digital mobile device under control of the computer-readable program, the resulting image is transmitted to the verifier's server.

Figure 6:
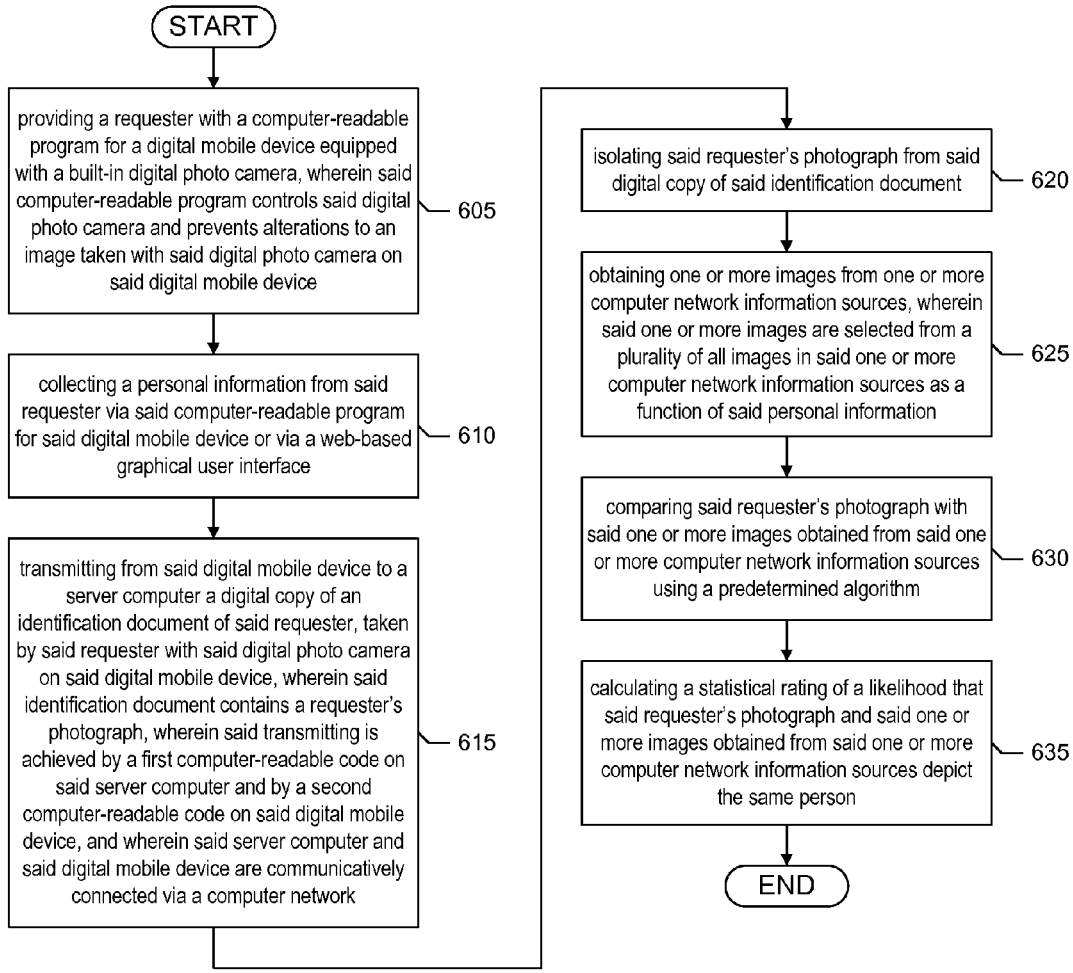

Another exemplary embodiment of a method of present invention is shown in FIG. 6. The method comprises the steps of: providing a requester with a computer-readable program (application) for a digital mobile device equipped with a built-in digital photo camera, where the computer-readable program controls the digital photo camera and prevents alterations to an image taken with the digital photo camera on the digital mobile device (step 605), collecting a personal information from the requester via the computer-readable program for the digital mobile device or via a web-based graphical user interface (step 610), transmitting from the digital mobile device to a server computer a digital copy of an identification document of the requester, taken by the requester with the digital photo camera on the digital mobile device, where the identification document contains a requester's photograph, where the transmitting is achieved by a first computer-readable code on the server computer and by a second computer-readable code on the digital mobile device, and where the server computer and the digital mobile device are communicatively connected via a computer network (step 615), isolating the requester's photograph from the digital copy of the identification document (step 620), obtaining one or more images from one or more computer network information sources, where the one or more images are selected from a plurality of all images in the one or more computer network information sources as a function of the personal information (step 625), comparing the requester's photograph with the one or more images obtained from the one or more computer network information sources using a predetermined algorithm (step 630), and calculating a statistical rating of a likelihood that the requester's photograph and the one or more images obtained from the one or more computer network information sources depict the same person (step 635).

Figure 7:
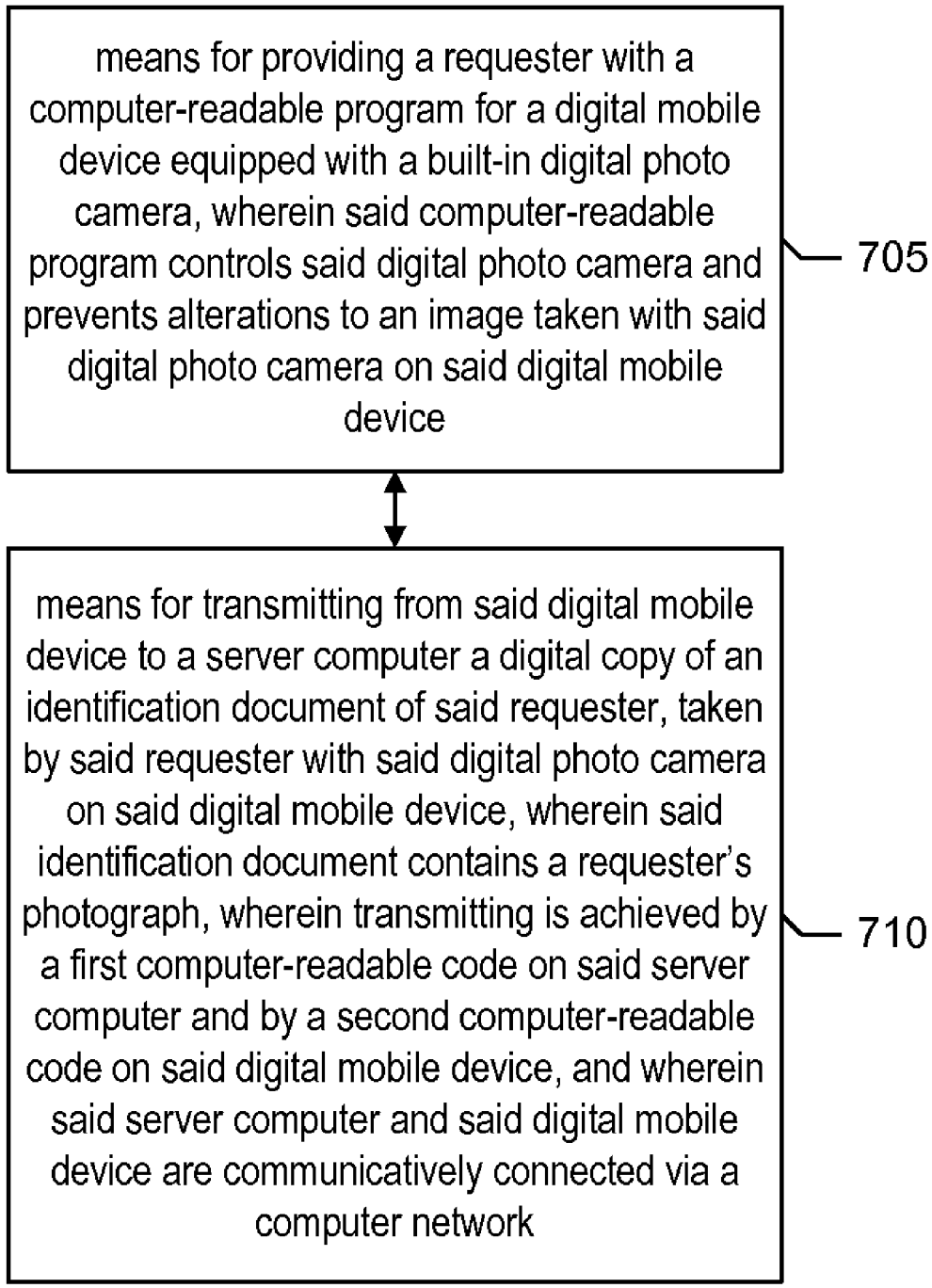

Another exemplary embodiment of a system of present invention is shown in FIG. 7. The system comprises: means for providing a requester with a computer-readable program (application) for a digital mobile device equipped with a built-in digital photo camera, where the computer-readable program controls the digital photo camera and prevents alterations to an image taken with the digital photo camera on the digital mobile device (705), and means for transmitting from the digital mobile device to a server computer a digital copy of an identification document of the requester, taken by the requester with the digital photo camera on the digital mobile device, where the identification document contains a requester's photograph, where transmitting is achieved by a first computer-readable code on the server computer and by a second computer-readable code on the digital mobile device, and where the server computer and the digital mobile device are communicatively connected via a computer network (710).

The means for providing a requester with a computer-readable program may include a computer server configured for downloading software onto digital mobile devices, an operating system installed on the digital mobile device and capable of downloading software from a server, etc. The means for transmitting a digital copy of an identification document may include a computer server configured for downloading data from the digital mobile devices to the server, a computer software installed on the digital mobile device and programmed to upload data from the digital mobile device to the server, etc.

Figure 8:
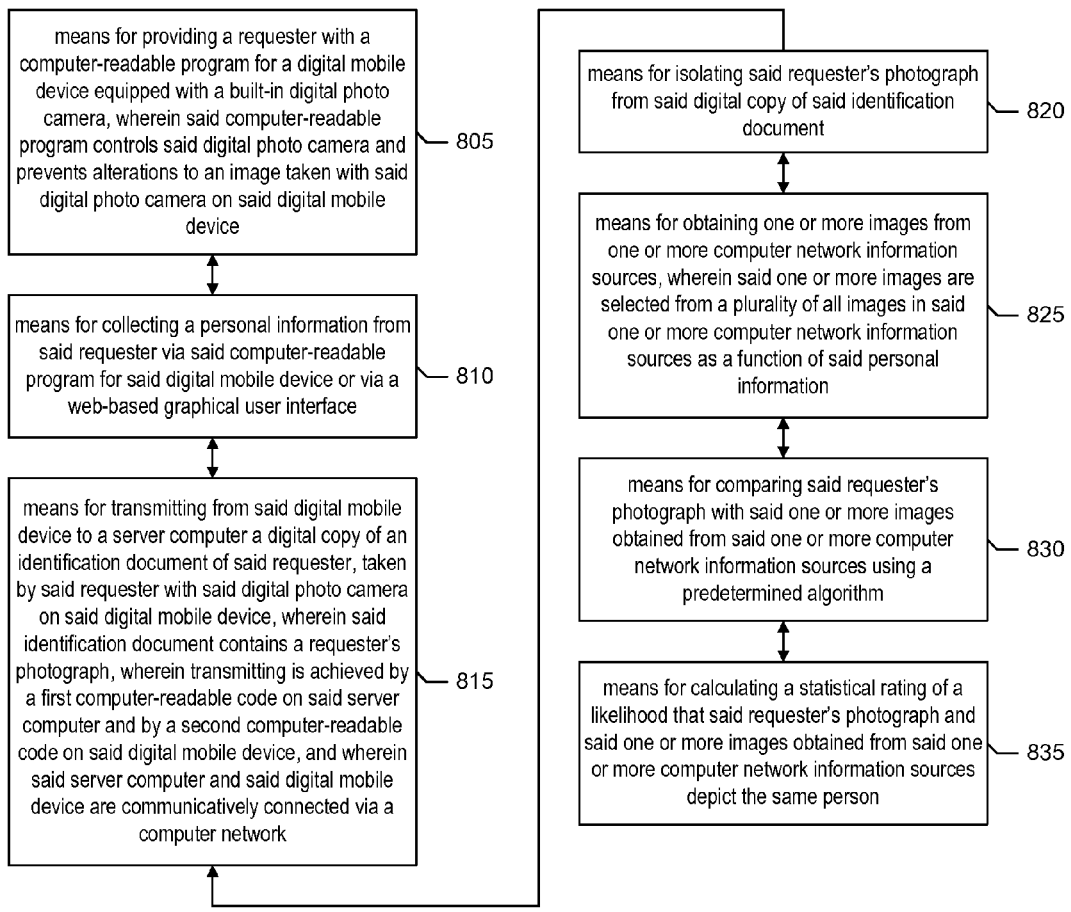

Another exemplary embodiment of a system of present invention is shown in FIG. 8. The system comprises: means for providing a requester with a computer-readable program (application) for a digital mobile device equipped with a built-in digital photo camera, where the computer-readable program controls the digital photo camera and prevents alterations to an image taken with the digital photo camera on the digital mobile device (805), means for collecting a personal information from the requester via the computer-readable program for the digital mobile device or via a web-based graphical user interface (810), means for transmitting from the digital mobile device to a server computer a digital copy of an identification document of the requester, taken by the requester with the digital photo camera on the digital mobile device, where the identification document contains a requester's photograph, where transmitting is achieved by a first computer-readable code on the server computer and by a second computer-readable code on the digital mobile device, and where the server computer and the digital mobile device are communicatively connected via a computer network (815), means for isolating the requester's photograph from the digital copy of the identification document (820), means for obtaining one or more images from one or more computer network information sources, where the one or more images are selected from a plurality of all images in the one or more computer network information sources as a function of the personal information (825), means for comparing the requester's photograph with the one or more images obtained from the one or more computer network information sources using a predetermined algorithm (830), and means for calculating a statistical rating of a likelihood that the requester's photograph and the one or more images obtained from the one or more computer network information sources depict the same person (835).

Figure 9:
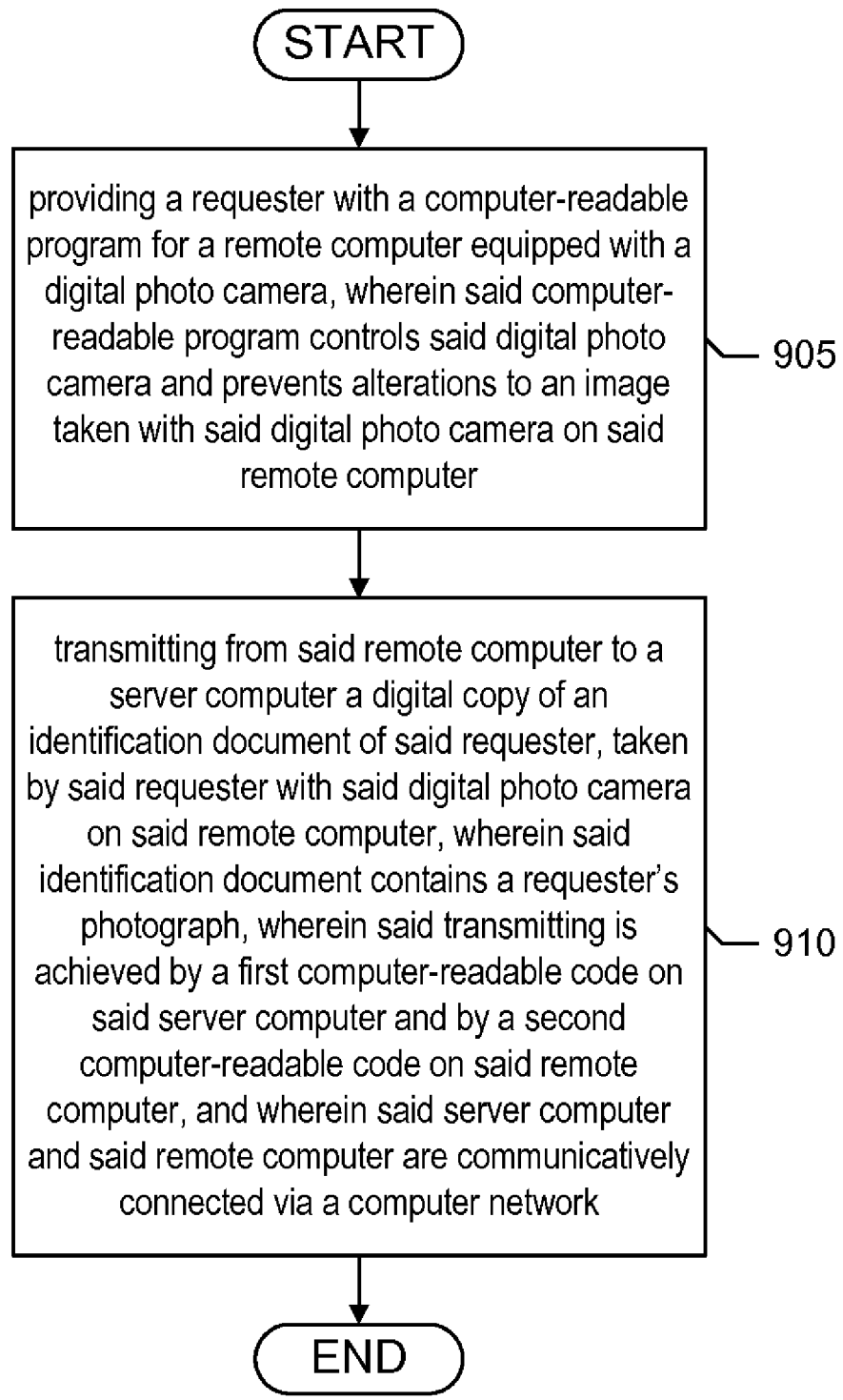

Another exemplary embodiment of a method of present invention is shown in FIG. 9. The method comprises the steps of: providing a requester with a computer-readable program for a remote computer equipped with a digital photo camera, where the computer-readable program controls the digital photo camera and prevents alterations to an image taken with the digital photo camera on the remote computer (step 905), and transmitting from the remote computer to a server computer a digital copy of an identification document of the requester, taken by the requester with the digital photo camera on the remote computer, where the identification document contains a requester's photograph, where the transmitting is achieved by a first computer-readable code on the server computer and by a second computer-readable code on the remote computer, and where the server computer and the remote computer are communicatively connected via a computer network (step 910).

Providing the requester with a computer-readable program for the remote computer equipped with a digital photo camera may be accomplished via a website or an application running on the remote computer suitable for downloading and installing computer-readable programs. The computer-readable program may be downloaded on the remote computer via a computer or cellular network, as well as via detachable memory storage devices.

The computer-readable program provided to the requester is designed to control the digital photo camera of the remote computer and prevents alterations to an image taken with the digital photo camera. Thus, the verifier ensures that the photographs of the documents or the portrait photographs of the requester taken with the digital photo camera through the provided computer-readable program were not tempered with.

After the requester took a picture of the identification document with the digital photo camera of the remote computer under control of the computer-readable program, the resulting image is transmitted to the verifier's server.

Figure 10:
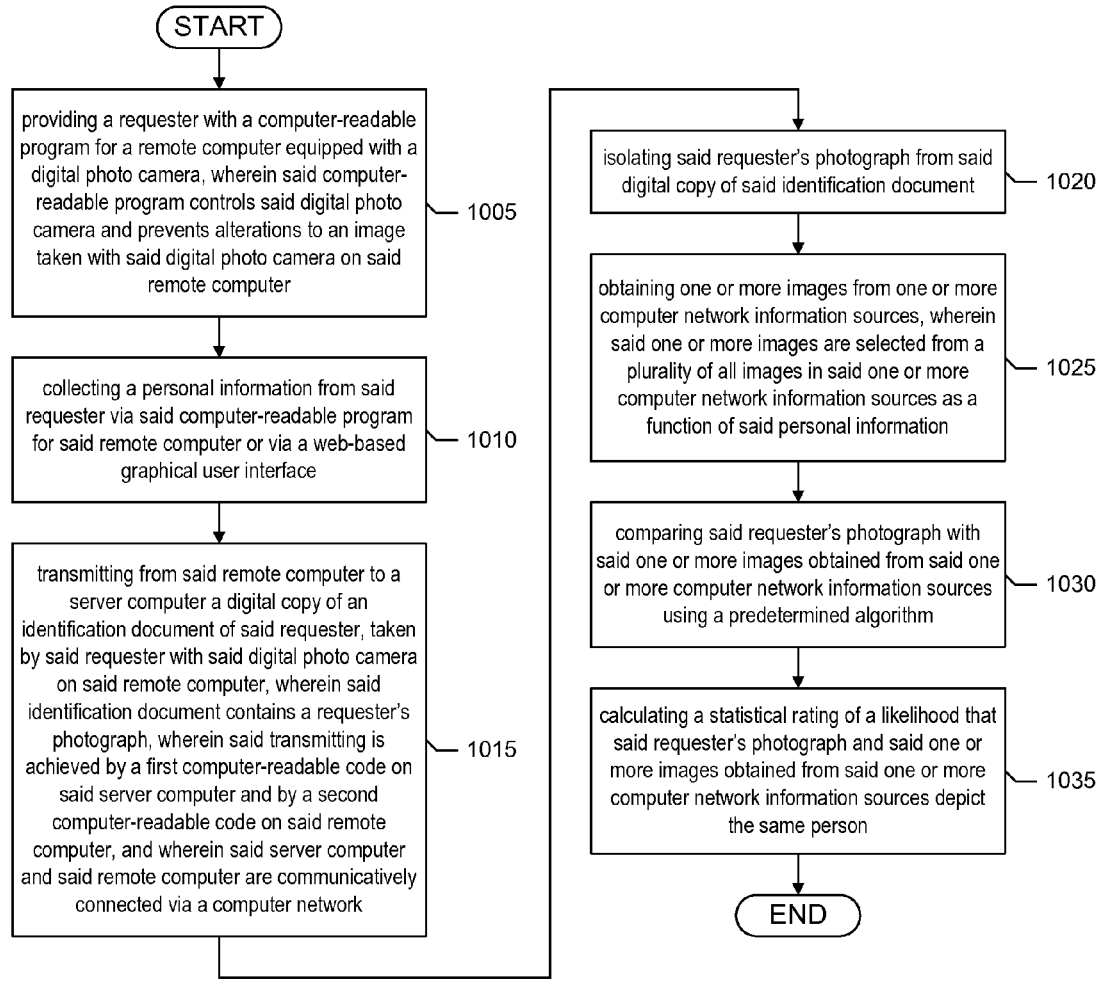

Another exemplary embodiment of a method of present invention is shown in FIG. 10. The method comprises the steps of: providing a requester with a computer-readable program for a remote computer equipped with a digital photo camera, where the computer-readable program controls the digital photo camera and prevents alterations to an image taken with the digital photo camera on the remote computer (step 1005), collecting a personal information from the requester via the computer-readable program for the remote computer or via a web-based graphical user interface (step 1010), transmitting from the remote computer to a server computer a digital copy of an identification document of the requester, taken by the requester with the digital photo camera on the remote computer, where the identification document contains a requester's photograph, where the transmitting is achieved by a first computer-readable code on the server computer and by a second computer-readable code on the remote computer, and where the server computer and the remote computer are communicatively connected via a computer network (step 1015), isolating the requester's photograph from the digital copy of the identification document (step 1020), obtaining one or more images from one or more computer network information sources, where the one or more images are selected from a plurality of all images in the one or more computer network information sources as a function of the personal information (step 1025), comparing the requester's photograph with the one or more images obtained from the one or more computer network information sources using a predetermined algorithm (step 1030), and calculating a statistical rating of a likelihood that the requester's photograph and the one or more images obtained from the one or more computer network information sources depict the same person (step 1035).

Figure 11:
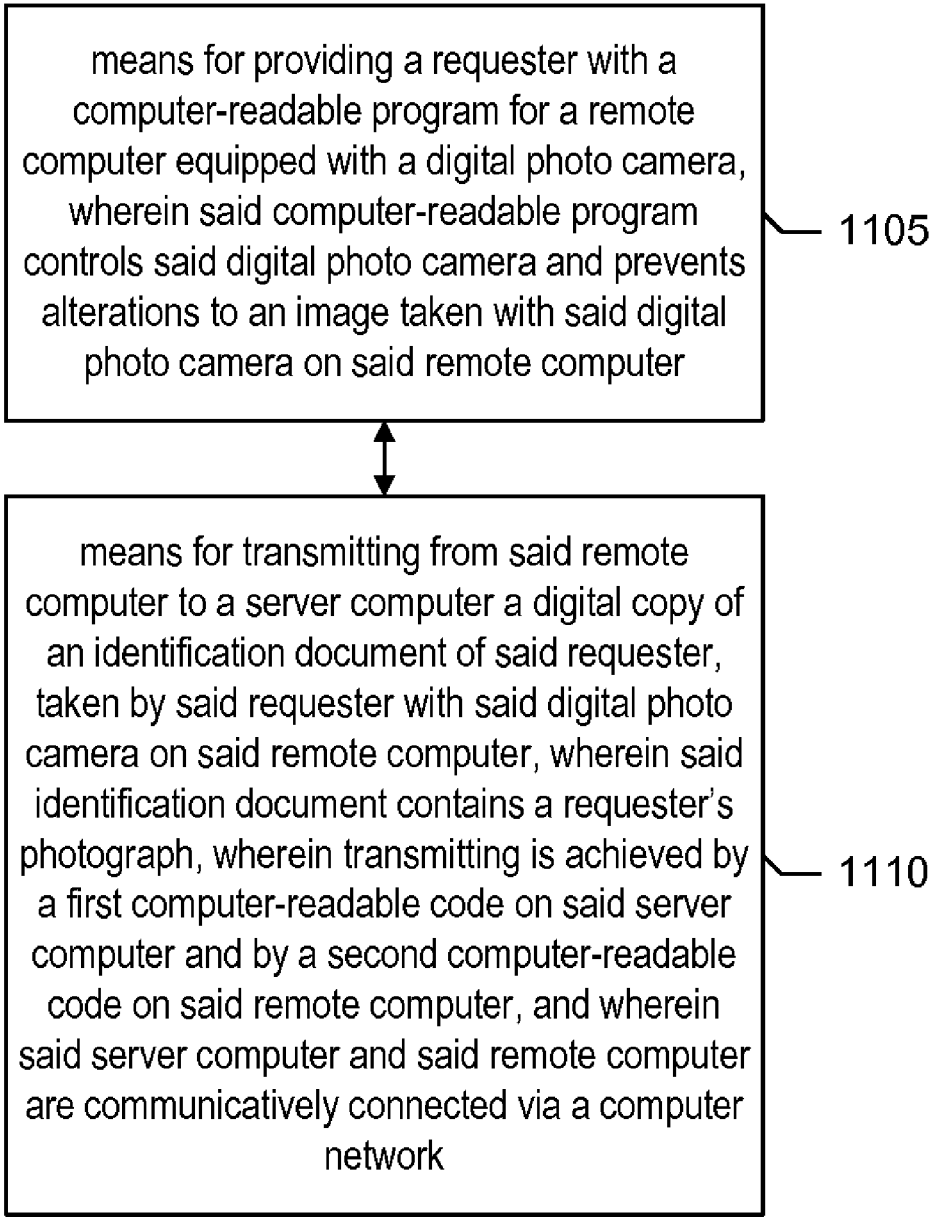

Another exemplary embodiment of a system of present invention is shown in FIG. 11. The system comprises: means for providing a requester with a computer-readable program for a remote computer equipped with a digital photo camera, where the computer-readable program controls the digital photo camera and prevents alterations to an image taken with the digital photo camera on the remote computer (1105), and means for transmitting from the remote computer to a server computer a digital copy of an identification document of the requester, taken by the requester with the digital photo camera on the remote computer, where the identification document contains a requester's photograph, where transmitting is achieved by a first computer-readable code on the server computer and by a second computer-readable code on the remote computer, and where the server computer and the remote computer are communicatively connected via a computer network (1110).

The means for providing a requester with a computer-readable program may include a computer server configured for downloading software onto remote computers, a software installed on the remote computer and capable of downloading computer-readable programs from a server, etc. The means for transmitting a digital copy of an identification document may include a computer server configured for downloading data from the remote computers to the server, a computer software installed on the remote computer and programmed to upload data from the remote computer to the server, etc.

Figure 12:
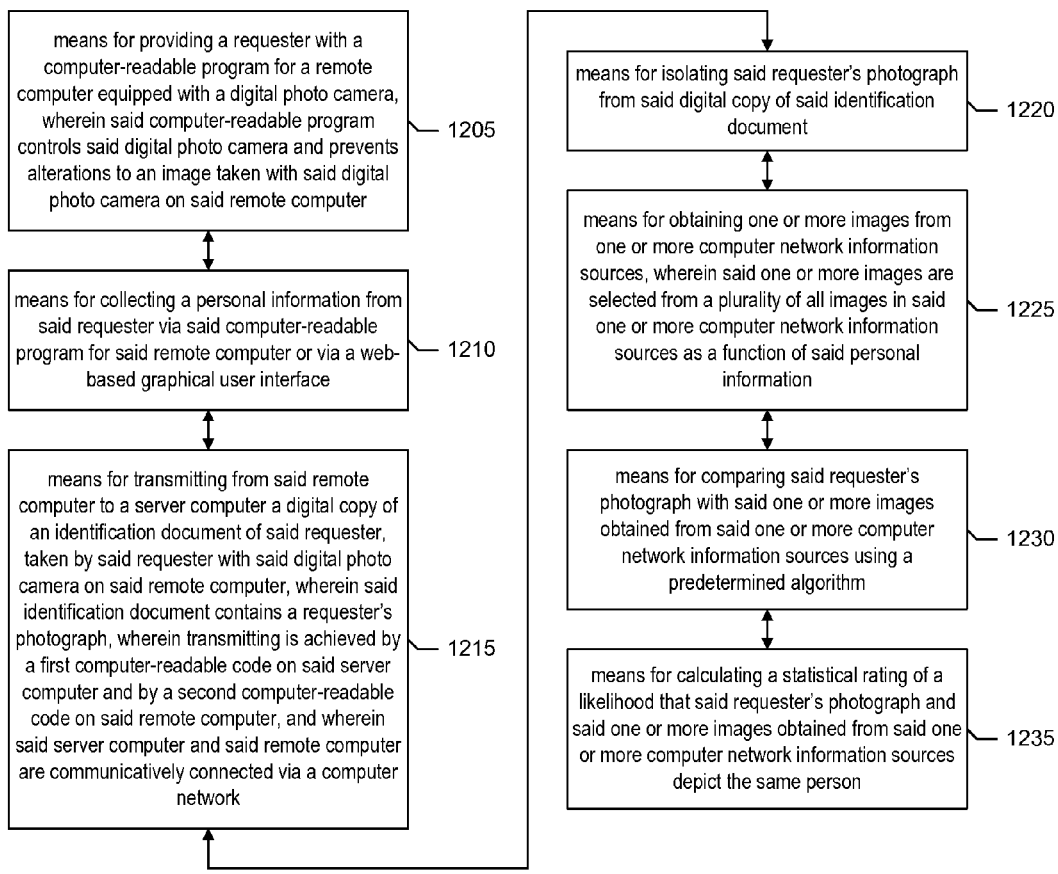

Another exemplary embodiment of a system of present invention is shown in FIG. 12. The system comprises: means for providing a requester with a computer-readable program for a remote computer equipped with a digital photo camera, where the computer-readable program controls the digital photo camera and prevents alterations to an image taken with the digital photo camera on the remote computer (1205), means for collecting a personal information from the requester via the computer-readable program for the remote computer or via a web-based graphical user interface (1210), means for transmitting from the remote computer to a server computer a digital copy of an identification document of the requester, taken by the requester with the digital photo camera on the remote computer, where the identification document contains a requester's photograph, where transmitting is achieved by a first computer-readable code on the server computer and by a second computer-readable code on the remote computer, and where the server computer and the remote computer are communicatively connected via a computer network (1215), means for isolating the requester's photograph from the digital copy of the identification document (1220), means for obtaining one or more images from one or more computer network information sources, where the one or more images are selected from a plurality of all images in the one or more computer network information sources as a function of the personal information (1225), means for comparing the requester's photograph with the one or more images obtained from the one or more computer network information sources using a predetermined algorithm (1230), and means for calculating a statistical rating of a likelihood that the requester's photograph and the one or more images obtained from the one or more computer network information sources depict the same person (1235).

Figure 13:
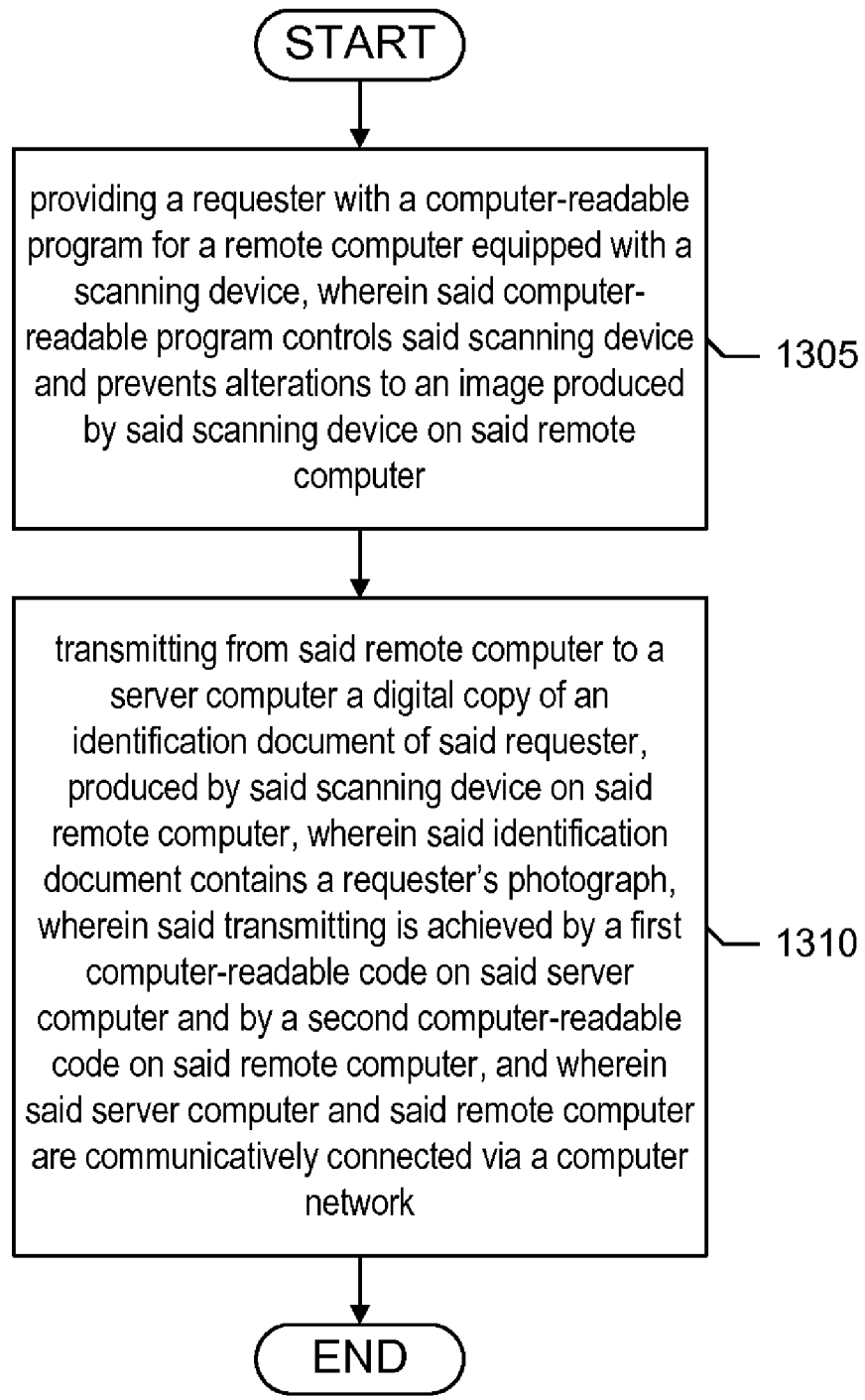

Another exemplary embodiment of a method of present invention is shown in FIG. 13. The method comprises the steps of: providing a requester with a computer-readable program for a remote computer equipped with a scanning device, where the computer-readable program controls the scanning device and prevents alterations to an image produced by the scanning device on the remote computer (step 1305), and transmitting from the remote computer to a server computer a digital copy of an identification document of the requester, produced by the scanning device on the remote computer, where the identification document contains a requester's photograph, where the transmitting is achieved by a first computer-readable code on the server computer and by a second computer-readable code on the remote computer, and where the server computer and the remote computer are communicatively connected via a computer network (step 1310).

Figure 14:
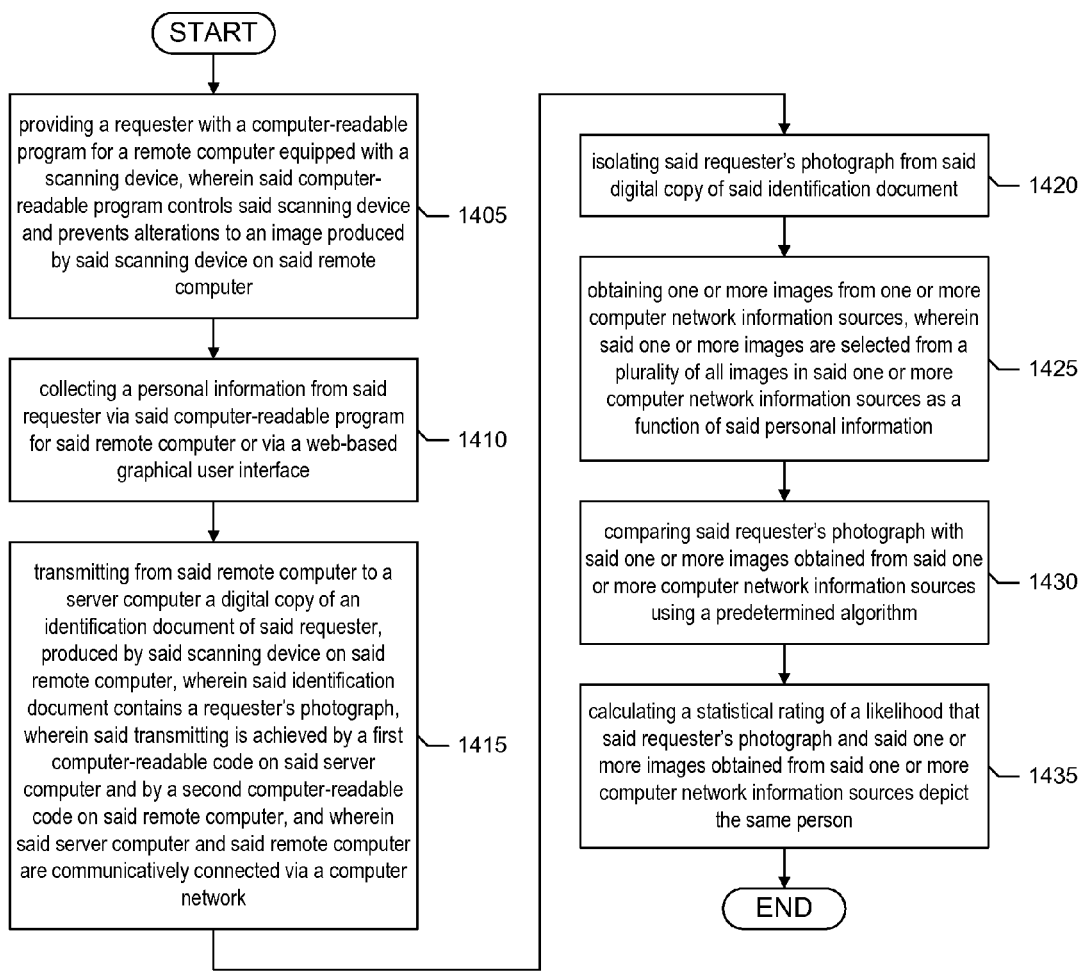

Another exemplary embodiment of a method of present invention is shown in FIG. 14. The method comprises the steps of: providing a requester with a computer-readable program for a remote computer equipped with a scanning device, where the computer-readable program controls the scanning device and prevents alterations to an image produced by the scanning device on the remote computer (step 1405), collecting a personal information from the requester via the computer-readable program for the remote computer or via a web-based graphical user interface (step 1410), transmitting from the remote computer to a server computer a digital copy of an identification document of the requester, produced by the scanning device on the remote computer, where the identification document contains a requester's photograph, where the transmitting is achieved by a first computer-readable code on the server computer and by a second computer-readable code on the remote computer, and where the server computer and the remote computer are communicatively connected via a computer network (step 1415), isolating the requester's photograph from the digital copy of the identification document (step 1420), obtaining one or more images from one or more computer network information sources, where the one or more images are selected from a plurality of all images in the one or more computer network information sources as a function of the personal information (step 1425), comparing the requester's photograph with the one or more images obtained from the one or more computer network information sources using a predetermined algorithm (step 1430), and calculating a statistical rating of a likelihood that the requester's photograph and the one or more images obtained from the one or more computer network information sources depict the same person (step 1435).

The scanning device may include an image scanner, a digital scanner, a stationary scanner, a flatbed scanner, a desktop scanner, a printer-scanner, a slide scanner, a film scanner, a photo scanner, a portable scanner, a handheld scanner, a sheet-fed scanner, a digital camera scanner, a drum scanner, etc.

The computer-readable program provided to the requester is designed to control the scanning device of the remote computer and prevents alterations to an image produced by the scanning device. Thus, the verifier ensures that the images of the requester's documents scanned (produced) by the scanning device through the provided computer-readable program were not tempered with.

After the requester scanned the identification document with the scanning device attached to the remote computer under control of the computer-readable program, the resulting image is transmitted to the verifier's server.

Figure 15:
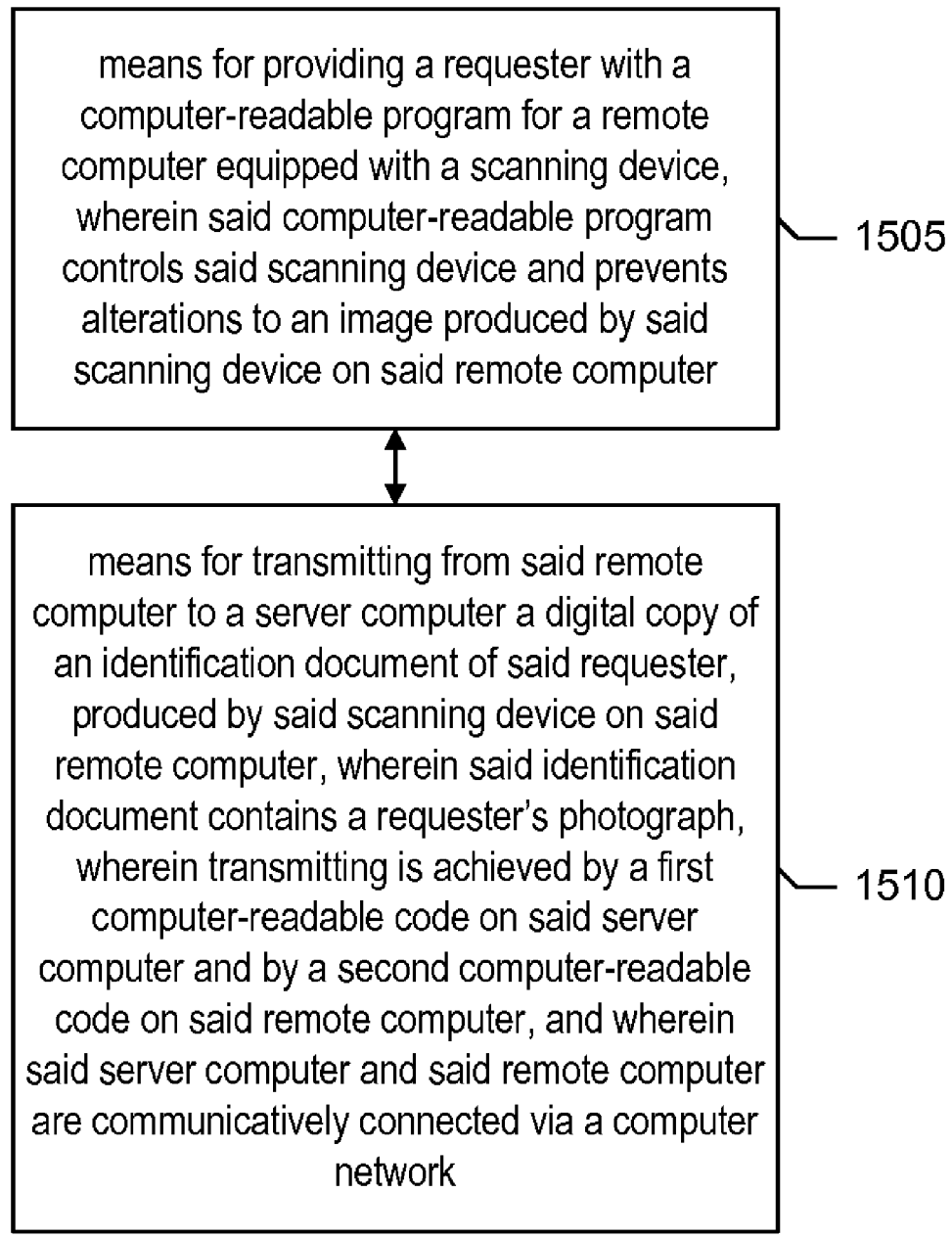

Another exemplary embodiment of a system of present invention is shown in FIG. 15. The system comprises: means for providing a requester with a computer-readable program for a remote computer equipped with a scanning device, where the computer-readable program controls the scanning device and prevents alterations to an image produced by the scanning device on the remote computer (1505), and means for transmitting from the remote computer to a server computer a digital copy of an identification document of the requester, produced by the scanning device on the remote computer, where the identification document contains a requester's photograph, where transmitting is achieved by a first computer-readable code on the server computer and by a second computer-readable code on the remote computer, and where the server computer and the remote computer are communicatively connected via a computer network (1510).

Figure 16:
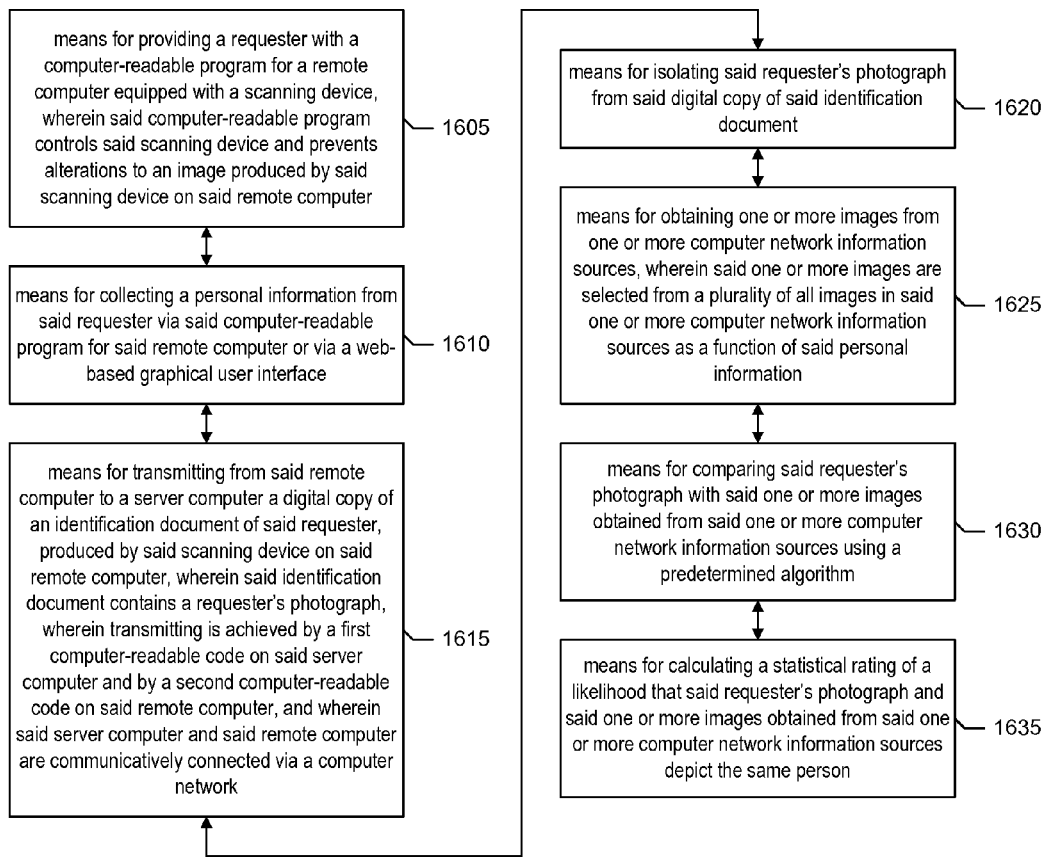

Another exemplary embodiment of a system of present invention is shown in FIG. 16. The system comprises: means for providing a requester with a computer-readable program for a remote computer equipped with a scanning device, where the computer-readable program controls the scanning device and prevents alterations to an image produced by the scanning device on the remote computer (1605), means for collecting a personal information from the requester via the computer-readable program for the remote computer or via a web-based graphical user interface (1610), means for transmitting from the remote computer to a server computer a digital copy of an identification document of the requester, produced by the scanning device on the remote computer, where the identification document contains a requester's photograph, where transmitting is achieved by a first computer-readable code on the server computer and by a second computer-readable code on the remote computer, and where the server computer and the remote computer are communicatively connected via a computer network (1615), means for isolating the requester's photograph from the digital copy of the identification document (1620), means for obtaining one or more images from one or more computer network information sources, where the one or more images are selected from a plurality of all images in the one or more computer network information sources as a function of the personal information (1625), means for comparing the requester's photograph with the one or more images obtained from the one or more computer network information sources using a predetermined algorithm (1630), and means for calculating a statistical rating of a likelihood that the requester's photograph and the one or more images obtained from the one or more computer network information sources depict the same person (1635).

Figure 17:
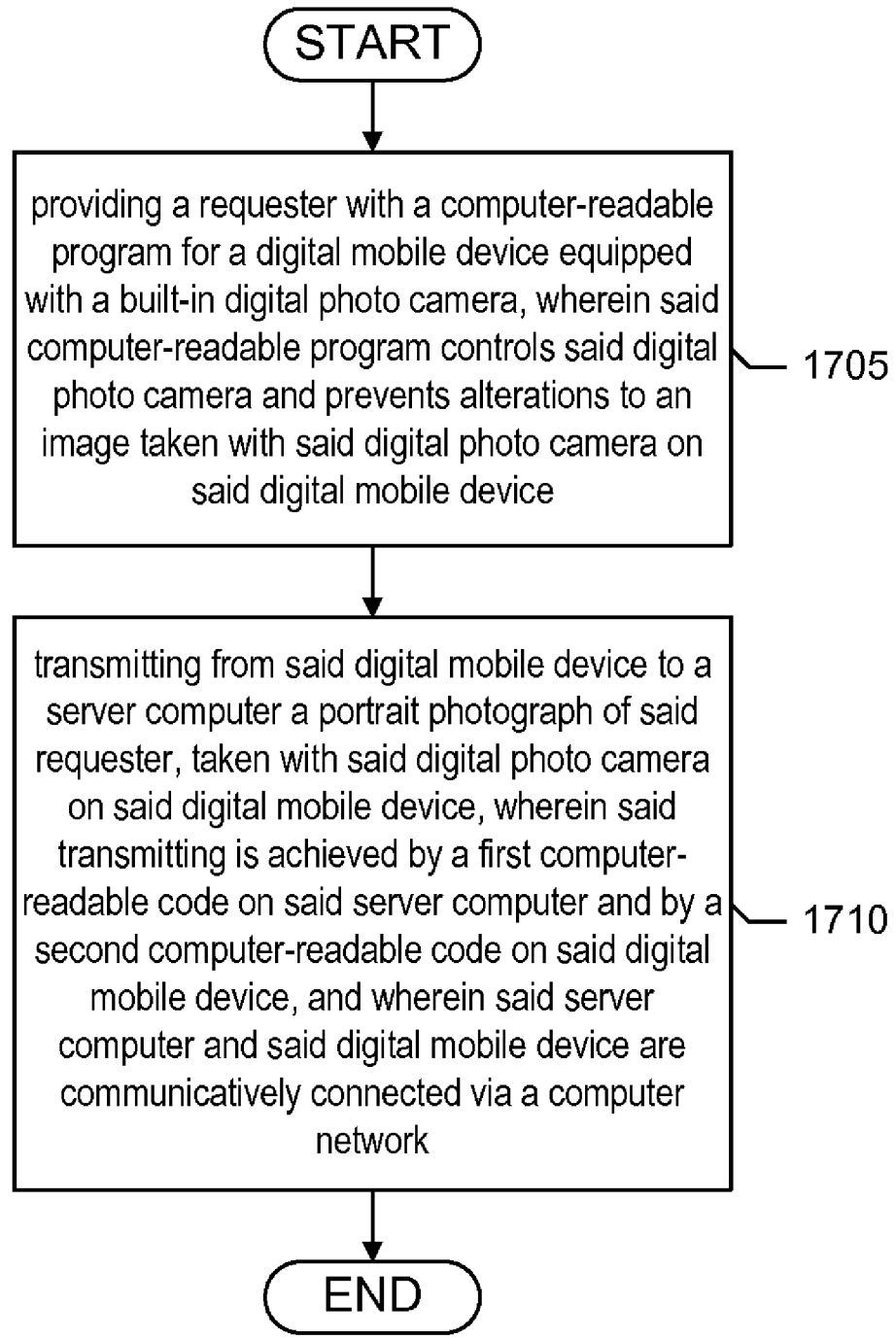

Another exemplary embodiment of a method of present invention is shown in FIG. 17. The method comprises the steps of: providing a requester with a computer-readable program (application) for a digital mobile device equipped with a built-in digital photo camera, where the computer-readable program controls the digital photo camera and prevents alterations to an image taken with the digital photo camera on the digital mobile device (step 1705), and transmitting from the digital mobile device to a server computer a portrait photograph of the requester, taken with the digital photo camera on the digital mobile device, where the transmitting is achieved by a first computer-readable code on the server computer and by a second computer-readable code on the digital mobile device, and where the server computer and the digital mobile device are communicatively connected via a computer network (step 1710).

The computer-readable program provided to the requester is designed to control the built-in digital photo camera of the digital mobile device and prevents alterations to an image taken with the digital photo camera. Thus, the verifier ensures that the photographs of the documents or the portrait photographs of the requester taken with the digital photo camera through the provided computer-readable program were not tempered with.

After the portrait photograph of the requester is taken with the digital photo camera of the digital mobile device under control of the computer-readable program, the resulting image is transmitted to the verifier's server.

Figure 18:
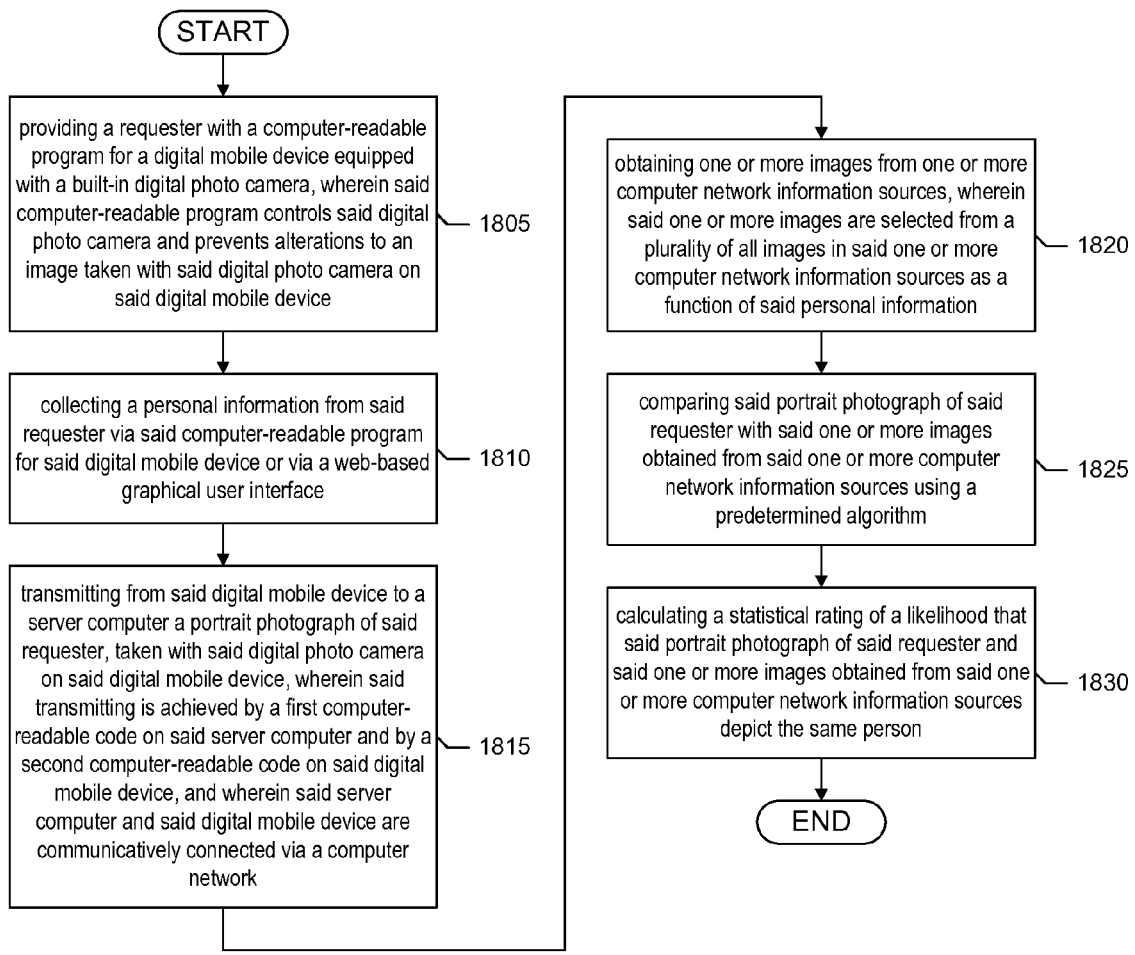

Another exemplary embodiment of a method of present invention is shown in FIG. 18. The method comprises the steps of: providing a requester with a computer-readable program (application) for a digital mobile device equipped with a built-in digital photo camera, where the computer-readable program controls the digital photo camera and prevents alterations to an image taken with the digital photo camera on the digital mobile device (step 1805), collecting a personal information from the requester via the computer-readable program for the digital mobile device or via a web-based graphical user interface (step 1810), transmitting from the digital mobile device to a server computer a portrait photograph of the requester, taken with the digital photo camera on the digital mobile device, where the transmitting is achieved by a first computer-readable code on the server computer and by a second computer-readable code on the digital mobile device, and where the server computer and the digital mobile device are communicatively connected via a computer network (step 1815), obtaining one or more images from one or more computer network information sources, where the one or more images are selected from a plurality of all images in the one or more computer network information sources as a function of the personal information (step 1820), comparing the portrait photograph of the requester with the one or more images obtained from the one or more computer network information sources using a predetermined algorithm (step 1825), and calculating a statistical rating of a likelihood that the portrait photograph of the requester and the one or more images obtained from the one or more computer network information sources depict the same person (step 1830).

The methods of the present invention further may extract a first set of facial features from the portrait photograph of the requester and a second set of facial features from the images obtained from the computer network information sources.

The first set of facial features from the portrait photograph of the requester and the second set of facial features from the images obtained from the computer network information sources may be compared utilizing a predetermined algorithm. The predetermined algorithm may include the principal component analysis with eigenface, the linear discriminate analysis, elastic bunch graph matching fisherface, the Hidden Markov model, the neuronal motivated dynamic link matching, skin texture analysis, face hallucination (low-resolution images enhancement), and many others.

Another exemplary embodiment of a system of present invention is shown in FIG. 19. The system comprises: means for providing a requester with a computer-readable program (application) for a digital mobile device equipped with a built-in digital photo camera, where the computer-readable program controls the digital photo camera and prevents alterations to an image taken with the digital photo camera on the digital mobile device (1905), and means for transmitting from the digital mobile device to a server computer a portrait photograph of the requester, taken with the digital photo camera on the digital mobile device, where transmitting is achieved by a first computer-readable code on the server computer and by a second computer-readable code on the digital mobile device, and where the server computer and the digital mobile device are communicatively connected via a computer network (1910).

Figure 20:
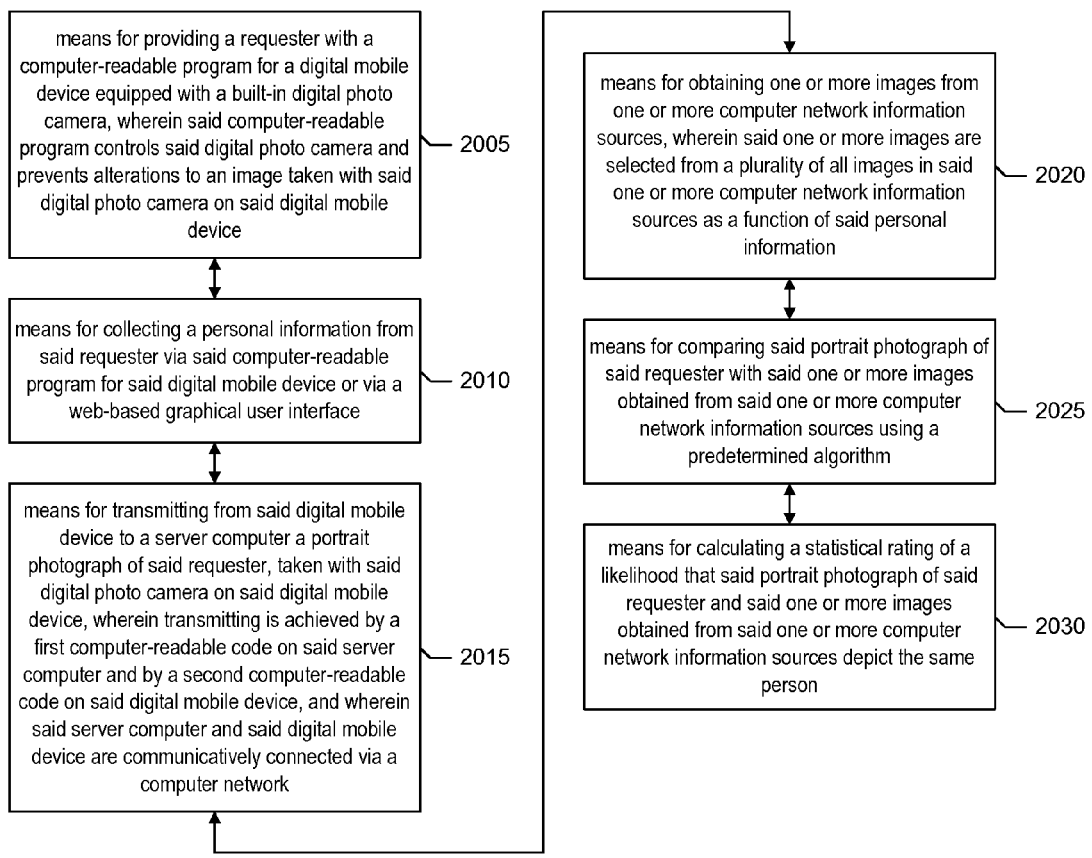

Another exemplary embodiment of a system of present invention is shown in FIG. 20. The system comprises: means for providing a requester with a computer-readable program (application) for a digital mobile device equipped with a built-in digital photo camera, where the computer-readable program controls the digital photo camera and prevents alterations to an image taken with the digital photo camera on the digital mobile device (2005), means for collecting a personal information from the requester via the computer-readable program for the digital mobile device or via a web-based graphical user interface (2010), means for transmitting from the digital mobile device to a server computer a portrait photograph of the requester, taken with the digital photo camera on the digital mobile device, where transmitting is achieved by a first computer-readable code on the server computer and by a second computer-readable code on the digital mobile device, and where the server computer and the digital mobile device are communicatively connected via a computer network (2015), means for obtaining one or more images from one or more computer network information sources, where the one or more images are selected from a plurality of all images in the one or more computer network information sources as a function of the personal information (2020), means for comparing the portrait photograph of the requester with the one or more images obtained from the one or more computer network information sources using a predetermined algorithm (2025), and means for calculating a statistical rating of a likelihood that the portrait photograph of the requester and the one or more images obtained from the one or more computer network information sources depict the same person (2030).

Figure 21:
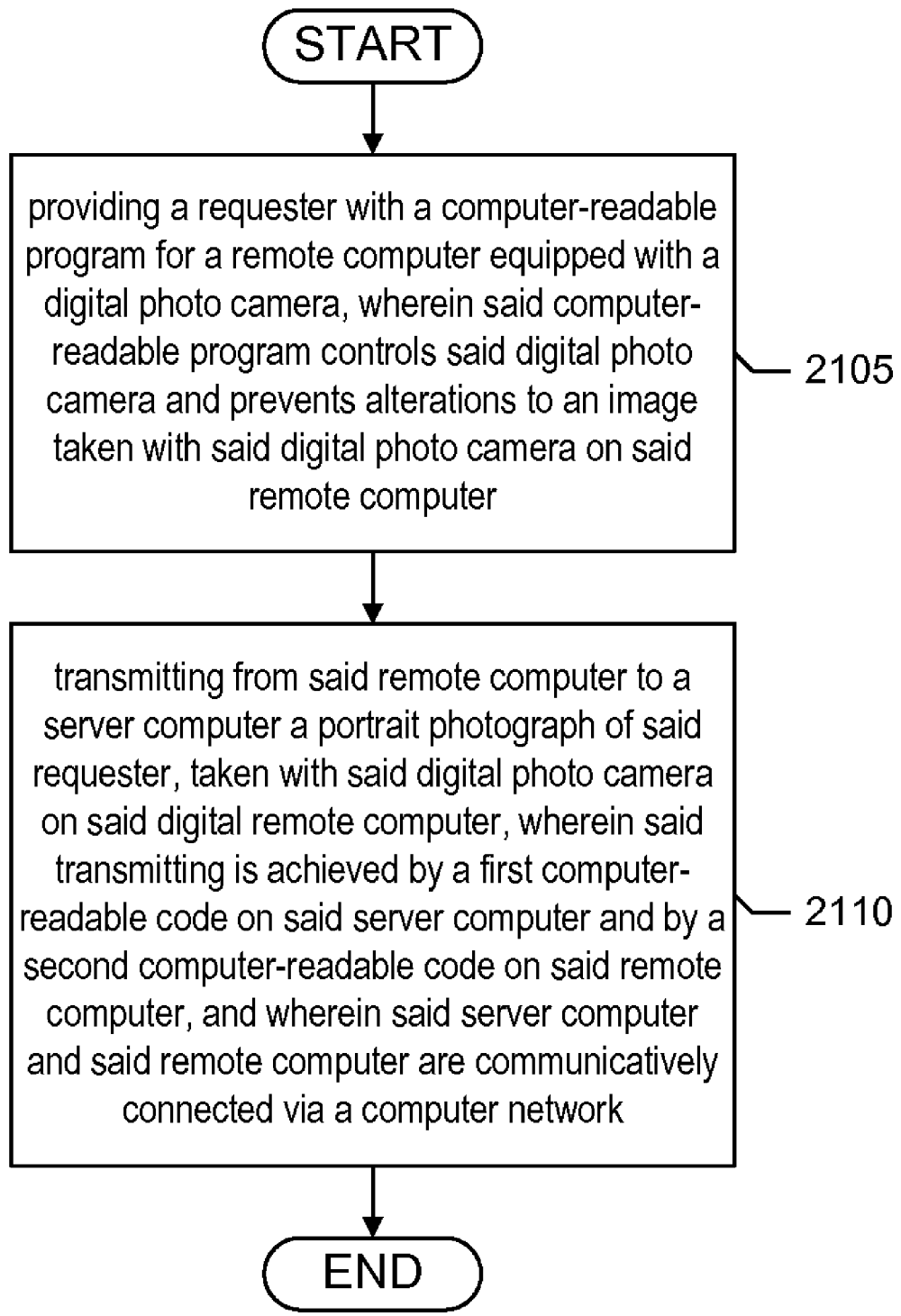

Another exemplary embodiment of a method of present invention is shown in FIG. 21. The method comprises the steps of: providing a requester with a computer-readable program for a remote computer equipped with a digital photo camera, where the computer-readable program controls the digital photo camera and prevents alterations to an image taken with the digital photo camera on the remote computer (step 2105), and transmitting from the remote computer to a server computer a portrait photograph of the requester, taken with the digital photo camera on the digital remote computer, where the transmitting is achieved by a first computer-readable code on the server computer and by a second computer-readable code on the remote computer, and where the server computer and the remote computer are communicatively connected via a computer network (step 2110).

Figure 22:
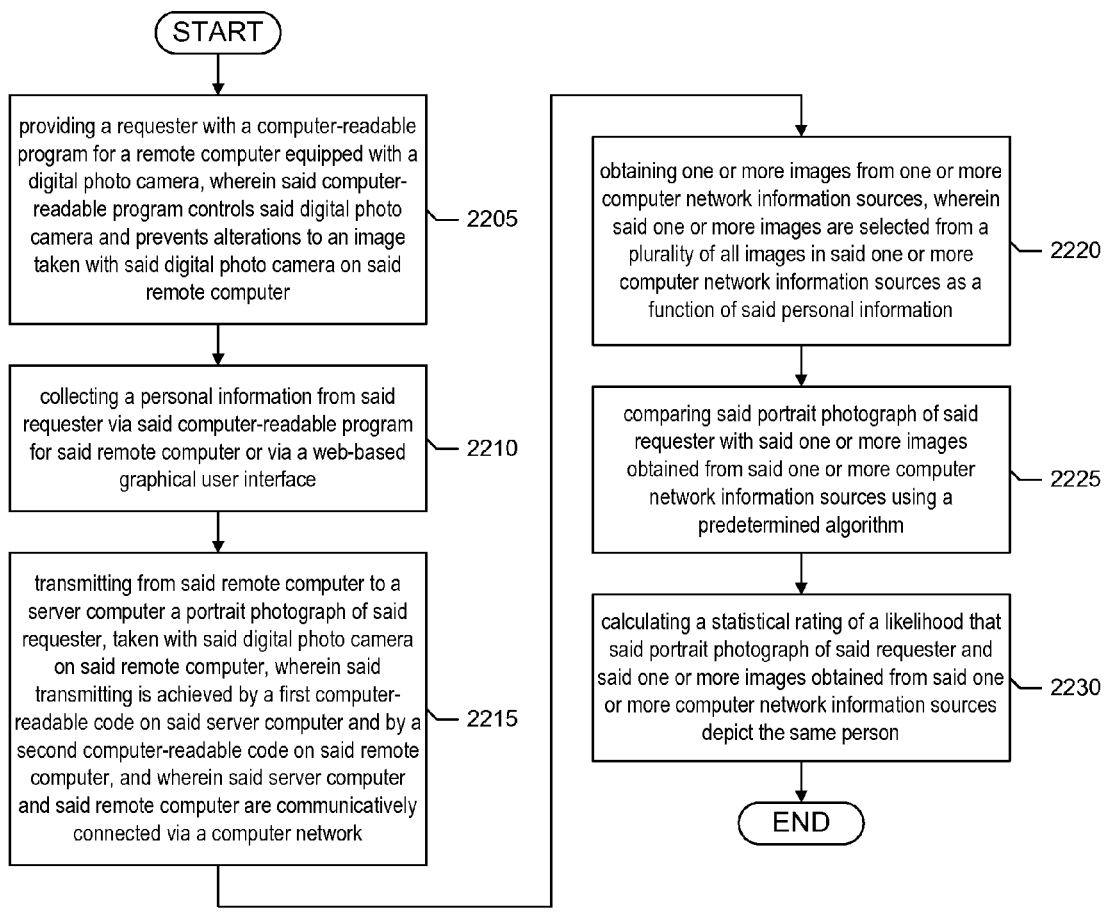

Another exemplary embodiment of a method of present invention is shown in FIG. 22. The method comprises the steps of: providing a requester with a computer-readable program for a remote computer equipped with a digital photo camera, where the computer-readable program controls the digital photo camera and prevents alterations to an image taken with the digital photo camera on the remote computer (step 2205), collecting a personal information from the requester via the computer-readable program for the remote computer or via a web-based graphical user interface (step 2210), transmitting from the remote computer to a server computer a portrait photograph of the requester, taken with the digital photo camera on the remote computer, where the transmitting is achieved by a first computer-readable code on the server computer and by a second computer-readable code on the remote computer, and where the server computer and the remote computer are communicatively connected via a computer network (step 2215), obtaining one or more images from one or more computer network information sources, where the one or more images are selected from a plurality of all images in the one or more computer network information sources as a function of the personal information (step 2220), comparing the portrait photograph of the requester with the one or more images obtained from the one or more computer network information sources using a predetermined algorithm (step 2225), and calculating a statistical rating of a likelihood that the portrait photograph of the requester and the one or more images obtained from the one or more computer network information sources depict the same person (step 2230).

Figure 23:
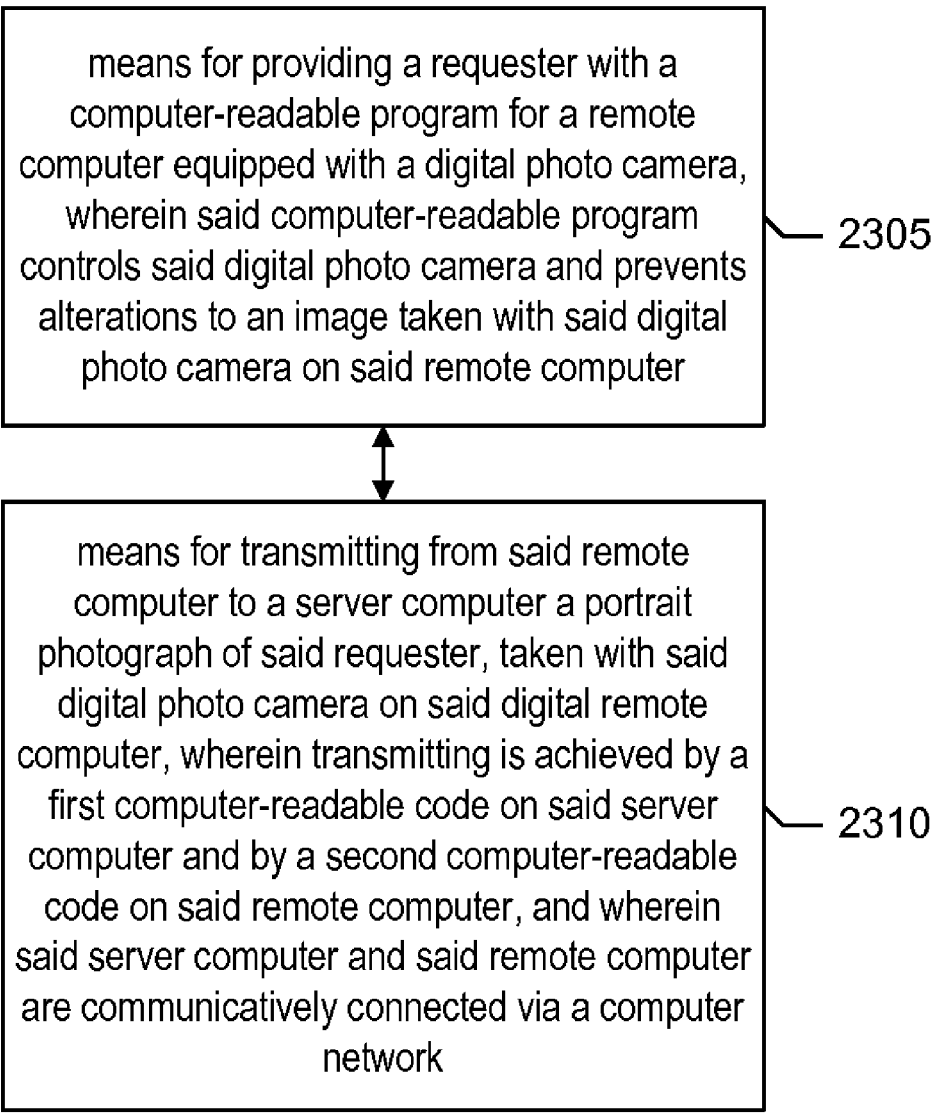

Another exemplary embodiment of a system of present invention is shown in FIG. 23. The system comprises: means for providing a requester with a computer-readable program for a remote computer equipped with a digital photo camera, where the computer-readable program controls the digital photo camera and prevents alterations to an image taken with the digital photo camera on the remote computer (2305), and means for transmitting from the remote computer to a server computer a portrait photograph of the requester, taken with the digital photo camera on the digital remote computer, where transmitting is achieved by a first computer-readable code on the server computer and by a second computer-readable code on the remote computer, and where the server computer and the remote computer are communicatively connected via a computer network (2310).

Figure 24:
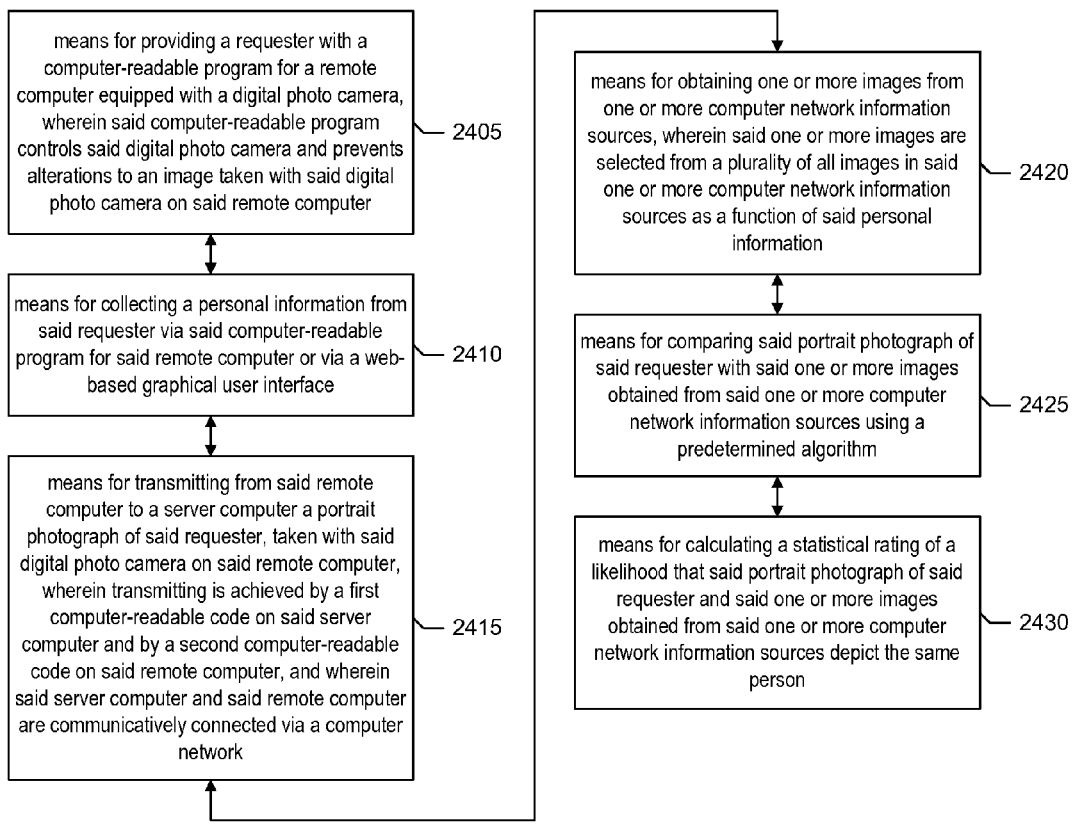

Another exemplary embodiment of a system of present invention is shown in FIG. 24. The system comprises: means for providing a requester with a computer-readable program for a remote computer equipped with a digital photo camera, where the computer-readable program controls the digital photo camera and prevents alterations to an image taken with the digital photo camera on the remote computer (2405), means for collecting a personal information from the requester via the computer-readable program for the remote computer or via a web-based graphical user interface (2410), means for transmitting from the remote computer to a server computer a portrait photograph of the requester, taken with the digital photo camera on the remote computer, where transmitting is achieved by a first computer-readable code on the server computer and by a second computer-readable code on the remote computer, and where the server computer and the remote computer are communicatively connected via a computer network (2415), means for obtaining one or more images from one or more computer network information sources, where the one or more images are selected from a plurality of all images in the one or more computer network information sources as a function of the personal information (2420), means for comparing the portrait photograph of the requester with the one or more images obtained from the one or more computer network information sources using a predetermined algorithm (2425), and means for calculating a statistical rating of a likelihood that the portrait photograph of the requester and the one or more images obtained from the one or more computer network information sources depict the same person (2430).

The means of the embodiments disclosed in the present specification can be substituted with machines, apparatuses, and devices described or listed in this specification or equivalents thereof. As a non-limiting example, the means of the embodiments may be substituted with a computing device, a computer-readable code, a computer-executable code, or any combination thereof.

All embodiments of the present invention may further be limited and implemented with any and all limitations disclosed in this specification or in the documents incorporated in this patent application by reference.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A method, comprising the steps of:
   a) providing a requester with a computer-readable program for a digital mobile device equipped with a built-in digital photo camera, wherein said computer-readable program controls said digital photo camera and prevents alterations to an image taken with said digital photo camera on said digital mobile device,
   b) a server computer receiving from said digital mobile device a digital copy of an identification document of said requester, taken by said requester with said digital photo camera on said digital mobile device, wherein said identification document contains a requester's photograph, wherein said receiving is achieved by a first computer-readable code on said server computer and by a second computer-readable code on said digital mobile device, and wherein said server computer and said digital mobile device are communicatively connected via a computer network,
   c) obtaining one or more images from one or more computer network information sources, wherein said one or more images are selected from a plurality of all images in said one or more computer network information sources as a function of a personal information of said requester, and
   d) calculating a statistical rating of a likelihood that said requester's photograph and said one or more images obtained from said one or more computer network information sources depict the same person.

2. The method of claim 1, wherein said statistical rating is calculated as a real number in a range from 0 to 1, wherein value 0 indicates the lowest likelihood and value 1 indicates the highest likelihood that said requester's photograph and said one or more images obtained from said one or more computer network information sources depict the same person.

3. The method of claim 2, wherein said statistical rating of value 0.5 and above indicates that said requester's photograph and said one or more images obtained from said one or more computer network information sources depict the same person.

4. The method of claim 1, wherein said statistical rating is calculated as an integer number of 0 or 1.

5. A method, comprising the steps of:
a) providing a requester with a computer-readable program for a digital mobile device equipped with a built-in digital photo camera, wherein said computer-readable program controls said digital photo camera and prevents alterations to an image taken with said digital photo camera on said digital mobile device,
b) collecting a personal information from said requester via said computer-readable program for said digital mobile device or via a web-based graphical user interface,
c) a server computer receiving from said digital mobile device a digital copy of an identification document of said requester, taken by said requester with said digital photo camera on said digital mobile device, wherein said identification document contains a requester's photograph, wherein said receiving is achieved by a first computer-readable code on said server computer and by a second computer-readable code on said digital mobile device, and wherein said server computer and said digital mobile device are communicatively connected via a computer network,
d) isolating said requester's photograph from said digital copy of said identification document,
e) obtaining one or more images from one or more computer network information sources, wherein said one or more images are selected from a plurality of all images in said one or more computer network information sources as a function of said personal information,
f) comparing said requester's photograph with said one or more images obtained from said one or more computer network information sources using a predetermined algorithm.

6. The method of claim 5, wherein said personal information is selected from the group consisting of a name of said requester, a mailing address of said requester, a home address of said requester, an electronic mail address of said requester, a telephone number of said requester, a date of birth of said requester, a login name of said requester to a social network website, an account number of said requester to a social network website, an account name of said requester to a social network website, and a password of said requester to a social network website.

7. The method of claim 5, wherein said computer network contains the Internet.

8. The method of claim 5, wherein said identification document is selected from the group consisting of a government issued identification document, a driver's license, a passport, and a state identification card.

9. The method of claim 5, wherein said isolating said requester's photograph from said digital copy of said identification document comprises analyzing said digital copy of said identification document using an optical face detection algorithm and identifying an area of said digital copy of said identification document containing facial features.

10. The method of claim 5, wherein said isolating said requester's photograph from said digital copy of said identification document comprises identifying a type of said identification document and extracting said requester's photograph from a predetermined area of said digital copy of said identification document corresponding to said type of said identification document.

11. The method of claim 5, wherein said one or more computer network information sources is selected from the group consisting of a website, a webpage, an online blog, a social network website, and an image sharing website.

12. The method of claim 5, wherein said function for selecting said one or more images from said plurality of all images in said one or more computer network information sources comprises selecting an image posted onto said one or more computer network information sources from an account of said requester.

13. The method of claim 5, wherein said function for selecting said one or more images from said plurality of all images in said one or more computer network information sources comprises selecting an image tagged with a name of said requester.

14. The method of claim 5, wherein said function for selecting said one or more images from said plurality of all images in said one or more computer network information sources comprises selecting an image appearing in a social network account of said requester.

15. The method of claim 5, further comprising the step of:
g) extracting a first set of facial features from said requester's photograph isolated from said digital copy of said identification document.

16. The method of claim 5, further comprising the step of:
g) extracting a second set of facial features from said one or more images obtained from said one or more computer network information sources.

17. The method of claim 5, wherein said predetermined algorithm for comparing said requester's photograph with said one or more images obtained from said one or more computer network information sources comprises comparing a first set of facial features extracted from said requester's photograph isolated from said digital copy of said identification document with a second set of facial features extracted from said one or more images obtained from said one or more computer network information sources.

18. A system, comprising:
a) means for providing a requester with a computer-readable program for a digital mobile device equipped with a built-in digital photo camera, wherein said computer-readable program controls said digital photo camera and prevents alterations to an image taken with said digital photo camera on said digital mobile device, and
b) means for receiving from said digital mobile device a digital copy of an identification document of said requester, taken by said requester with said digital photo camera on said digital mobile device, wherein said identification document contains a requester's photograph, wherein receiving is achieved by a first computer-readable code on a server computer and by a second computer-readable code on said digital mobile device, and wherein said server computer and said digital mobile device are communicatively connected via a computer network,
c) obtaining one or more images from one or more computer network information sources, wherein said one or more images are selected from a plurality of all images in said one or more computer network information sources as a function of a personal information of said requester, and d) calculating a statistical rating of a likelihood that said requester's photograph and said one or more images obtained from said one or more computer network information sources depict the same person.

19. A system, comprising:
a) means for providing a requester with a computer-readable program for a digital mobile device equipped with a built-in digital photo camera, wherein said computer-readable program controls said digital photo camera and prevents alterations to an image taken with said digital photo camera on said digital mobile device,
b) means for collecting a personal information from said requester via said computer-readable program for said digital mobile device or via a web-based graphical user interface,
c) means for receiving from said digital mobile device a digital copy of an identification document of said requester, taken by said requester with said digital photo camera on said digital mobile device, wherein said identification document contains a requester's photograph, wherein receiving is achieved by a first computer-readable code on a server computer and by a second computer-readable code on said digital mobile device, and wherein said server computer and said digital mobile device are communicatively connected via a computer network,
d) means for isolating said requester's photograph from said digital copy of said identification document,
e) means for obtaining one or more images from one or more computer network information sources, wherein said one or more images are selected from a plurality of all images in said one or more computer network information sources as a function of said personal information,
f) means for comparing said requester's photograph with said one or more images obtained from said one or more computer network information sources using a predetermined algorithm, and
g) means for calculating a statistical rating of a likelihood that said requester's photograph and said one or more images obtained from said one or more computer network information sources depict the same person.

20. The system of claim 19, wherein said personal information is selected from the group consisting of a name of said requester, a mailing address of said requester, a home address of said requester, an electronic mail address of said requester, a telephone number of said requester, a date of birth of said requester, a login name of said requester to a social network website, an account number of said requester to a social network website, an account name of said requester to a social network website, and a password of said requester to a social network website.

21. The system of claim 19, wherein said computer network contains the Internet.

22. The system of claim 19, wherein said identification document is selected from the group consisting of a government issued identification document, a driver's license, a passport, and a state identification card.

23. The system of claim 19, wherein said means for isolating said requester's photograph from said digital copy of said identification document comprises means for analyzing said digital copy of said identification document using an optical face detection algorithm and means for identifying an area of said digital copy of said identification document containing facial features.

24. The system of claim 19, wherein said means for isolating said requester's photograph from said digital copy of said identification document comprises means for identifying a type of said identification document and means for extracting said requester's photograph from a predetermined area of said digital copy of said identification document corresponding to said type of said identification document.

25. The system of claim 19, wherein said one or more computer network information sources is selected from the group consisting of a website, a webpage, an online blog, a social network website, and an image sharing website.

26. The system of claim 19, wherein said function for selecting said one or more images from said plurality of all images in said one or more computer network information sources comprises selecting an image posted onto said one or more computer network information sources from an account of said requester.

27. The system of claim 19, wherein said function for selecting said one or more images from said plurality of all images in said one or more computer network information sources comprises selecting an image tagged with a name of said requester.

28. The system of claim 19, wherein said function for selecting said one or more images from said plurality of all images in said one or more computer network information sources comprises selecting an image appearing in a social network account of said requester.

29. The system of claim 19, further comprising:
h) means for extracting a first set of facial features from said requester's photograph isolated from said digital copy of said identification document.

30. The system of claim 19, further comprising:
h) means for extracting a second set of facial features from said one or more images obtained from said one or more computer network information sources.

31. The system of claim 19, wherein said predetermined algorithm for comparing said requester's photograph with said one or more images obtained from said one or more computer network information sources comprises comparing a first set of facial features extracted from said requester's photograph isolated from said digital copy of said identification document with a second set of facial features extracted from said one or more images obtained from said one or more computer network information sources.

32. The system of claim 19, wherein said statistical rating is calculated as a real number in a range from 0 to 1, wherein value 0 indicates the lowest likelihood and value 1 indicates the highest likelihood that said requester's photograph and said one or more images obtained from said one or more computer network information sources depict the same person.

33. The system of claim 32, wherein said statistical rating of value 0.5 and above indicates that said requester's photograph and said one or more images obtained from said one or more computer network information sources depict the same person.

34. The system of claim 19, wherein said statistical rating is calculated as an integer number of 0 or 1.

* * * * *